(12) United States Patent
Peterson

(10) Patent No.: US 10,824,969 B2
(45) Date of Patent: Nov. 3, 2020

(54) SYSTEM AND METHOD FOR LOCATE REQUEST ENTRY CONFIGURED FOR DEFINING MULTIPLE EXCAVATION SITES AS PART OF A SINGLE LOCATE REQUEST

(71) Applicant: One Call Concepts, Inc., Hanover, MD (US)

(72) Inventor: Randall Mark Peterson, Hales Corner, WI (US)

(73) Assignee: One Call Concepts, Inc., Hanover, MD (US)

( * ) Notice: Subject to any disclaimer, the term of this patent is extended or adjusted under 35 U.S.C. 154(b) by 1114 days.

(21) Appl. No.: 14/741,014

(22) Filed: Jun. 16, 2015

(65) Prior Publication Data

US 2016/0048783 A1 Feb. 18, 2016

Related U.S. Application Data

(60) Provisional application No. 62/013,191, filed on Jun. 17, 2014.

(51) Int. Cl.
*G06Q 10/06* (2012.01)
*G06F 3/048* (2013.01)

(52) U.S. Cl.
CPC ....... *G06Q 10/06311* (2013.01); *G06F 3/048* (2013.01)

(58) Field of Classification Search
CPC .. G06Q 10/00; G06Q 30/02; G06Q 10/06311; G06F 3/048; G06F 3/04812

USPC ............................................... 705/7.11–7.42
See application file for complete search history.

(56) References Cited

U.S. PATENT DOCUMENTS

| | | | |
|---|---|---|---|
| 2010/0088164 A1* | 4/2010 | Nielsen | G06Q 10/06 705/7.41 |
| 2010/0205032 A1* | 8/2010 | Nielsen | G06Q 10/06 705/7.11 |
| 2010/0228588 A1* | 9/2010 | Nielsen | G06Q 10/06 705/7.11 |
| 2011/0022433 A1* | 1/2011 | Nielsen | G06Q 10/06 705/7.27 |
| 2011/0046999 A1* | 2/2011 | Nielsen | G06Q 10/063 705/7.39 |
| 2012/0036140 A1* | 2/2012 | Nielsen | G06F 17/30241 707/754 |

OTHER PUBLICATIONS

Costa-Requena et al., SIP Dealing with Location Based Information, Journal of Communications and Networks, vol. 3, No. 4, Dec. 2001, pp. 351-360 (Year: 2001).*

* cited by examiner

*Primary Examiner* — Robert D Rines

(57) ABSTRACT

A system and method for identifying multiple excavation sites and generating multiple locate requests from a single locate request session comprising an electronic interactive interface for defining a geographic area, wherein the geographic area defined represents an area for evaluation of the presence or absence of one or more underground facilities, an auto-populating interactive smart map, a rules engine for determining a number of tickets per area defined, and a database and/or electronic storage of one or more underground facilities.

6 Claims, 26 Drawing Sheets

SYSTEM AND METHOD FOR LOCATE REQUEST ENTRY CONFIGURED FOR DEFINING MULTIPLE EXCAVATION SITES AS PART OF A SINGLE LOCATE REQUEST

CROSS REFERENCE TO RELATED APPLICATIONS

The present application claims the benefit of earlier filed U.S. Provisional patent application No. 62/013,191, filed on 17 Jun. 2014, the contents of which are herein incorporated by reference in its entirety.

BACKGROUND OF THE INVENTION

Public utility and other systems are often run underground; some by the very nature of their function, others for convenience or aesthetics. Before beginning a job, such as construction or landscaping that involves "breaking ground" at an excavation site, excavators in most states are required to contact a local One Call System (811) to notify the center and its members of the proposed excavation activity and location such that the existing underground systems' locations can be determined and marked. The One Call System safeguards the public's welfare by reducing the risk of inadvertent damage to underground facility lines—damage which can result in a major facility outage or serious accident, or an evacuation due to a gas leak or local flooding. The One Call System, in part, collects information regarding the proposed excavation project and area, and it in turn, based on the geographic location a ticket is generated for a locate operation to be performed at a specific site within the excavation area. The ticket is passed on to the appropriate facility companies or other entities responsible for an underground facility at the proposed site of excavation. The locate operation is performed by or on behalf of the facility companies, in order to mark the ground, thereby identifying the presence of an underground facility at the site.

SUMMARY OF THE INVENTION

The present invention provides a more efficient system of electronic ticket generation for locate operations, saving time and effort, and reducing the burden on the One Call Center and entities filing such locate requests. In one embodiment, a method of generating one or more electronic tickets as part of a single Notice Session comprises the steps of presenting an interactive interface, wherein the interactive interface is an interactive map presented on a display of a portable device; identifying, on the interactive interface, one or more of a user defined area, wherein the user defined area contains a site of a proposed excavation event; presenting the user defined area visually, such as by a line, and superimposed on the interactive map; transferring a set of geographic metadata associated with the one or more user defined areas from the portable device to a server wherein is stored a list of predefined area rules; analyzing the one or more user defined areas against a set of predefined area rules and upon analysis, calculating a value for each of the one or more user defined area, wherein the value represents a number of zones required per user defined area; sub-dividing each user defined area into the corresponding number of zones; analyzing each of the zones against a set of predefined zone rules and calculating a value that corresponds to one or more areas of notification within each zone, wherein the areas of notification correspond to an area for evaluation of the presence or absence of an underground facility; and generating an electronic ticket that corresponds to each of areas of notification.

In one embodiment, a system for identifying multiple excavation sites and generating multiple locate requests from a single locate request session comprises an electronic interactive interface for defining a geographic area, wherein the geographic area defined represents an area for evaluation of the presence or absence of one or more underground facilities, an auto-populating interactive smart map, a rules engine for determining a number of tickets per area defined, and a database and/or electronic storage of one or more underground facilities.

In another embodiment, a system for generating a plurality of locate request tickets as part of a single locate request session, comprises an interactive map containing a geographic region, wherein the interactive map is displayed on a display unit of a portable device; a set of geographic coordinates corresponding to a point along a boundary of a dig area within the geographic region; a rules engine database or other electronic storage in communication with the portable device comprising a set of rules for evaluating the dig area in order to divide the dig area into one or more areas of notification based on one or more of a predefined rule, wherein the areas of notification correspond to a geographic area comprising a boundary identified by one or more geographic coordinates, to be evaluated for the detection of an underground utility object in advance of an excavation; and means for linking one or more of a unique identifier to each area of notification, wherein the unique identifier comprises a locate request ticket number, thereby creating an electronic record of the area of notification.

In yet another embodiment, a system for identifying multiple excavation sites and generating multiple locate requests from a single locate request session, wherein the system comprises: a portable device comprising a client terminal; one or more of a server in communication with the portable device; a rules engine; and a software application that is installed on the portable device and when executed on a processor of the portable device, performs a set of instructions according to the methods described herein.

A system and process for populating a ticket form for a locate request, based on user input, comprises an interactive mapping interface, a referential search, a referential distance, and a message or command related to marking instructions for an areas of notification correlated to a ticket number.

A method for generating one or more of an area of notification, wherein the area of notification corresponds to a geographic area to be evaluated for the detection of an underground utility object in advance of an excavation, comprises: identifying a dig area on an interactive map displayed on a portable device; collecting one or more of a set of geographic data corresponding to a boundary of the dig area identified on the interactive map, wherein geographic data comprises a location, a grid coordinate, an address, a search history or search history parameter, or a combination thereof; calculating an area for evaluation based on the geographic data points; applying a rules engine against the area for evaluation in order to calculate a value comprising a number of tickets required, wherein the rules engine comprises a database or other electronic storage of one or more of the following: data and information related to underground facility operators; and business rules or call center rules related to the management of locate operations by a One Call Center; dividing the area of evaluation into one or more of the area of notification according to the value calculated; and for each area of notification, generating, based on the analysis of the rules engine against the area for evaluation, one or more of an index of geographic data points corresponding to each area of notification; associating one or more of a unique identifier with each area of notification, wherein the unique identifier comprises a locate request ticket number, thereby creating an electronic record of the area of notification; and storing for later retrieval the electronic record, wherein storage may be local on the portable device or external on a server.

A method for displaying an interactive map on a computing device, comprises storing information to be displayed on the interactive map in a memory in communication with the computing device, the stored information comprising a plurality of different layers of mapping information, wherein each layer contains a respective type of information relating to a geographic region; displaying a map on a display of the computing device, the map comprising a plurality of the layers of information stored, superimposed upon one another, the map configured to receive user input; and in response to a user input to identify an excavation entity, displaying at least one layer comprising a visual indicator of the excavation entity; extrapolating from the mapping layers, geographic data associated with the identified excavation entity; analyzing the geographic data associated with the identified excavation entity against a rules engine in order to a number of locate tickets to be associated with the excavation entity; assigning one or more ticket numbers to the excavation entity, wherein ticket numbers comprise a locate operation in order to create a locate request; and storing data associated with the locate request.

BRIEF DESCRIPTION OF THE DRAWINGS

Embodiments of the invention are further illustrated hereinafter by the accompanying figures.

FIGS. 1A-1K show various screen shots of a locate request system, which show various embodiments of an interface 100 and interactive map 110 and ticketing system.

DETAILED DESCRIPTION OF THE INVENTION

Figure 1A:
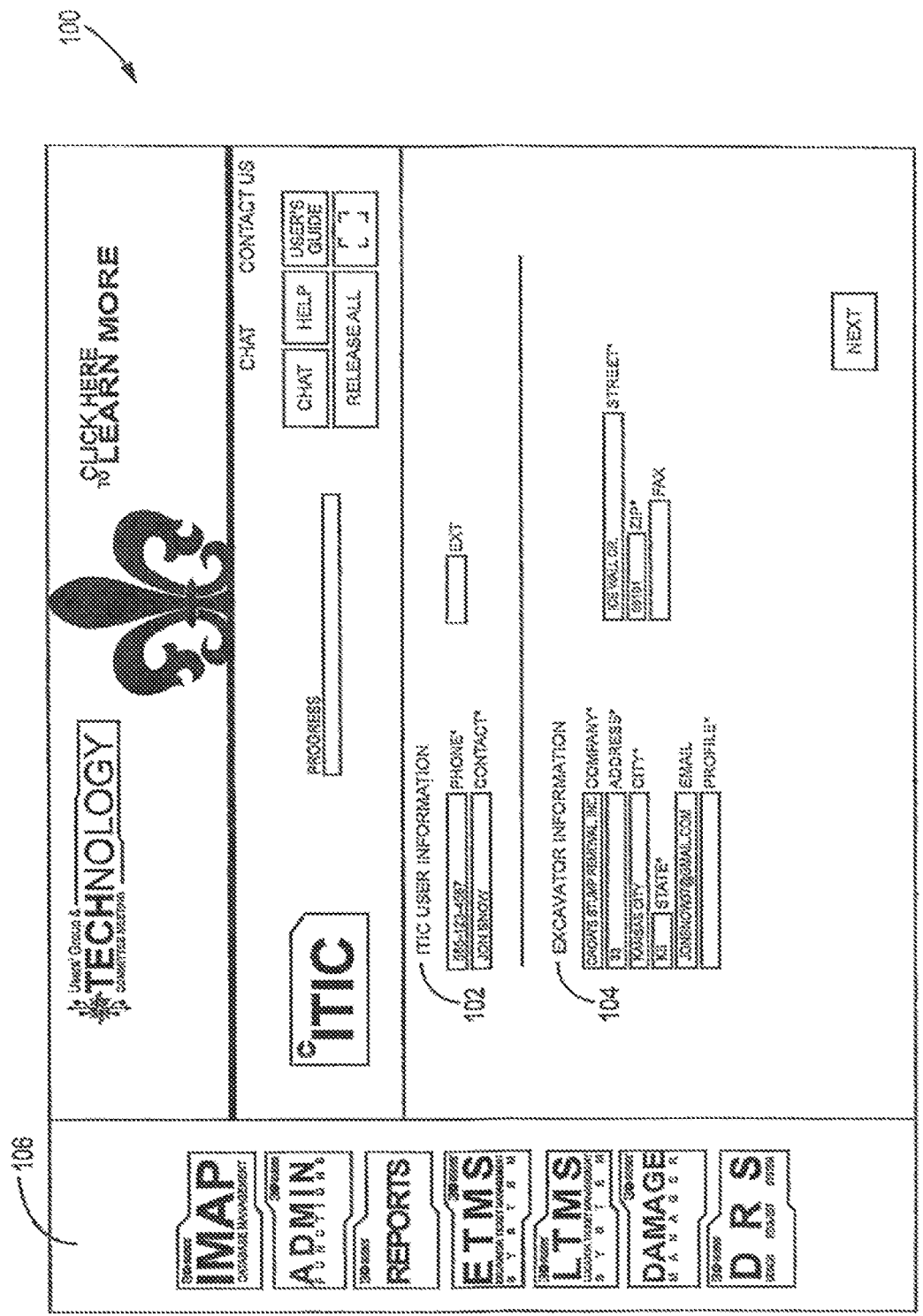

Described herein is a system and method for locate requests entry, configured for defining multiple excavation sites as part of a single or multiple locate request(s). In describing different aspects of the invention and the environment in which the invention operates the following terms are used. These terms are used for explanation purposes only and are not intended to limit the scope for any aspect of the invention.

DEFINITIONS

Excavation as used herein refers to any operation using non-mechanized or mechanized equipment, demolition, or explosives in the movement of earth, rock, or other material below the surface of the earth (ground level).

Excavation entity as used herein refers to a defined geographic region in which an excavation activity, or geographic dig, will take place; the entity may be identified in various forms, such as a parcel of land, a route, a circle, a polygon- or a free-form shape that indicates the boundaries of a geographic region.

One Call System and/or One Call Center as used herein refers to an entity that administers a system through which a person can notify owners/operators of lines or facilities of proposed excavations.

Ticket as used herein refers to a form containing information about a proposed excavation as well as a request to mark facilities on the ground.

WAN as used herein refers to a network that covers a broad area (i.e., any telecommunications network that links across metropolitan, regional, national or international boundaries) using, for example, leased telecommunication lines.

LAN as used herein refers to a network where all devices are connected within a limited physical area, i.e. home, school, office, etc.

Locate Operation as used herein refers to the indication of a line or facility by establishing a mark through the use of stakes, paint, flagging, whiskers, or some other customary manner that approximately determines the location of that line or facility.

Notice as used herein refers to the timely communication by the excavator/designer to the One Call Center that alerts the involved underground facility owners/operators of the intent to excavate.

Notice Session as used herein would be a period of time a user is active on a system to generate a ticket for a locate request. For example, if the user enters into the system all of the excavation areas that they intend to perform over a period of time, and does so in one "sitting", the user would be active for one "session". One notice session may result in one or in a plurality of tickets.

The system and method comprises an electronic interactive interface for defining a geographic area—an excavation entity—for evaluation of the presence or absence of one or more underground facilities, an auto-populating ticket form, a rules engine for determining a number of tickets per area defined, and a database or other electronic storage of underground facilities. In one embodiment, the system may be web-based.

In one embodiment, the ticket comprises a set of instructions necessary for a locate technician to perform a locate operation. In another embodiment, the ticket might specify, for example, the address or description of the area to perform the locate operation, the day and/or time to perform the operation, and/or whether area is to be marked for telecommunications, power, gas, water, sewer, or some other underground facility.

The method and system is configured to define multiple excavation entities within a defined geographic area—that are subsequently used to create a single or multiple Locate Request (ticket) based on the rules desired by the controlling One Call Center, which is presently not possible based on current technology and the state of One Call Center architecture and infrastructure.

In one embodiment, the present invention is a method of generating one or more electronic tickets as part of a single Notice Session, the method comprising the steps of presenting an interactive interface, wherein the interactive interface is an interactive map presented on a display of a portable device; identifying, on the interactive interface, one or more of a user defined area (excavation entity), wherein the user defined area contains a site of a proposed excavation event; presenting the user defined area visually, such as by a line, and superimposed on the interactive map; transferring a set of geographic metadata associated with the one or more user defined areas from the portable device to a server wherein is stored a list of predefined area rules; analyzing the one or more user defined areas against a set of predefined area rules and upon analysis, calculating a value for each of the one or more user defined area, wherein the value represents a number of zones required per user defined area; sub-dividing each user defined area into the corresponding number of zones; analyzing each of the zones against a set of predefined zone rules and calculating a value that corresponds to one or more areas of notification within each zone, wherein the areas of notification correspond to an area for evaluation of the presence or absence of an underground facility; and generating an electronic ticket that corresponds to each of areas of notification.

In one embodiment, the system is configured with a graphic user interface for data entry, specifically user-supplied information such as contact information, information related to the excavation, nature of the work to be performed, start date of the project, etc. In another embodiment, the system is configured with an interactive map configured for a user to identify an area in which an excavation or dig will take place and where the presence or absence of an underground facility must be determined. In one embodiment, the interactive map is a map of a portion of the United States. The interactive map is configured to allow identification of the user defined area by selecting an area of the map while it is displayed on a screen, and without the need to enter the address or other geographic information pertaining to the user defined area.

In one embodiment the user defined area can be selected by touch screen or by the use of a computer mouse or GPS-enabled device to select one or more geographic areas on the map where an excavation will take place. One or more areas can be selected on the interactive map. The selected areas can be displayed as a polygon, a parcel, or a circle, as determined by the user.

In another embodiment, the interactive map is configured with input tools including but not limited to, tabs instructing the system to: create a polygon over a user defined area; create an excavation circle of a specified radius around a point identified by a user; and select a parcel, depending on the excavation area, route or job to be performed.

Based on the area(s) identified, pertinent textual information required to complete the locate request (e.g. county, place name, street name, grid coordinates, specific work location marking instructions, lat/long coordinates) is transferred to a locate request form; in other words, the request locate form is auto-populated based on the area selected by the user on the interactive map interface.

In one embodiment, the interactive map interface of the system described herein comprises a top layer comprising a user defined area; a bottom layer comprising a base map layer; and a plurality of layers, wherein the plurality of layers may include, but is not limited to an excavation area layer, a parcel layer, a line map layer, and a facility map layer, an ortho map layer, a road features layer, a water features layer, a highway layer, a parcel layer, a building footprint layer a route layer, or one or more of a TIGER file layer. In one embodiment, the interactive mapping layers are stored in memory for retrieval and display on the display screen of a computing device configured for extrapolation of data and geographic coordinates embedded within the mapping layers, in response to user action.

In one embodiment, the system compares the user defined area of the top layer against the remaining interactive map layers and returns a list of which information and/or features overlap or intersect amongst the layers. The system extracts a list of information that match, such as geographic identifying information (county, city, street, closest intersection) from one or more points throughout the user defined area.

In another embodiment, the system is configured, based on the comparison of the user defined area to the embedded layers of the map, to generate a location of the user defined area, whereby the location corresponds to a site for proposed excavation, within which the presence or absence of underground facilities must be determined.

In another embodiment, the system is configured to auto-populate a one or more informational fields of a request locate form, based on information from the interactive map.

In another embodiment, system is configured to accept files and stored data from user files for generating excavation entities for display on the interactive map. In one embodiment, an excavation circle of a specified radius around a point identified by a user is created by uploading data from a user files. For example, when data has been generated for an excavation event and the lat/long coordinates are known and stored to a format such as a GIS file, the system is configured to accept the GIS file and GIS file data. For example, a point in a data file is used to generate a circle; line data would be used to generate a route; and polygon data would be used to generate a polygon, which in turn would be evaluated for a number of areas of notifications, and corresponding tickets for locate operations.

In another embodiment, the system is configured for identifying, on the interactive interface, one or more of a user defined area, wherein the user defined area contains a site of a proposed excavation event; presenting the user defined area visually, such as by a line, and superimposed on the interactive map; transferring a set of geographic metadata associated with the one or more user defined areas from the portable device to a server wherein is stored a list of predefined area rules; analyzing the one or more user defined areas against a set of predefined area rules and upon analysis, calculating a value for each of the one or more user defined area, wherein the value represents a number of zones required per user defined area; sub-dividing each user defined area into the corresponding number of zones; analyzing each of the zones against a set of predefined zone rules and calculating a value that corresponds to one or more areas of notification within each zone, wherein the areas of notification correspond to an area for evaluation of the presence or absence of an underground facility; and generating a plurality of electronic locate request tickets that correspond to each of the areas of notification and sending the plurality of electronic locate request tickets to one or more underground facility owners and/or one or more locate service so that they can conduct a locate operation to verify a presence or absence of an underground facility.

In one embodiment, the system is configured to allow a user to identify one or more dig sites on an interactive map as part of a single session. For each area identified, the system evaluates the number of tickets required and divides the area into areas of notification, which results in a specific number of tickets.

In one embodiment, the user defined area is compared to a set of predefined area rules, which are specific to the geographic area selected in order to calculate a value for each of the one or more user defined areas, wherein the value represents a number of zones required per user defined area. In one particular embodiment, this analysis and calculation is carried out by way of a rules engine. The rules engine comprises an algorithm that compares user identified geographic data to predefined data stored in a database or electronic storage and calculates, based in part on local rules of the One Call Center for the state, county, or city in which the user defined area resides, a number of zones. For example, a user defined polygon may be divided, upon analysis by the rules engine, into 3 zones; zone 1, zone 2 and zone 3.

In one embodiment, the rules engine comprises a database or electronic storage of state and local rules governing underground facility locate operations, data and information related to state boundaries, county boundaries, municipality boundaries, and any other necessary data and or business rules or call center rules related to the management of locate operations by a One Call Center.

For example: the rules engine performs an analysis of the user defined area; the system may query if a portion of the land area comprising the user defined area extends to a rural area, and if so, any rules specific to rural land areas will apply to the user defined area; likewise, if a user defined area extends over a county line, or a municipality line, the rules engine will apply the rules for each specific county or municipality to which the user defined area extends. An assortment and arrangement of rules are envisioned; the example provided is illustrative and not meant to limit the invention.

In one embodiment, each zone is in turn sub-divided into areas of notification, with each area of notification in turn being assigned a ticket. In one embodiment, the areas of notification are determined by analyzing each of the zones (for example, zone 1, zone 2, and zone 3) against a set of predefined zone rules and calculating a value that corresponds to one or more areas of notification within each zone, wherein the areas of notification correspond to an area for evaluation of the presence or absence of an underground facility.

In one embodiment, zone rules comprise a database or electronic storage of call center rules governing the number of tickets generated over a specific land area, depending on the number and proximity of locate operations to be performed within a specific area. For example: if it is desired that a locate operation occurring within (or beyond) a certain mile radius of another locate operation, then the system will generate multiple tickets, rather than assigning both locate operations to a single ticket.

In another embodiment, each area of notification is assigned a ticket number for a locate operation and is then transferred from the system to an entity responsible for an underground facility or an entity responsible for a locate operation.

In another embodiment, the electronic record containing ticket information is sent via a wireless communications network.

In one embodiment, a system and method for locate request entry configured for defining multiple excavation sites as part of a single session comprises: identifying one or more areas on an interactive map interface; comparing coordinates of the areas selected to a set of map layer data and extracting from the map layer data a geographic location that corresponds to the area identified; auto-populating selected fields of an electronic locate request based on the geographic location identified; for each area identified, comparing the geographic area against a list of rules analyzed via a rules engine and generating a value, wherein the value corresponds to a number of zones required per identified area, and wherein the zones extend over a specific geographic area as determined by the rules engine; comparing each zone to a set of zone rules and generating a ticket value, wherein the value corresponds to one or more areas of notification needed per zone, and wherein a ticket value is assigned per area of notification.

In one embodiment the system and method operates in an exemplary network environment including one or more of a portable user device (i.e., a client terminal), one or more of a server, wherein the portable device and server communicate over a LAN or WAN network. In one embodiment, the client terminal comprises a laptop computer, desktop computer, a tablet, a smartphone, or other suitable portable device configured with a display screen, a processor and means of wireless communication with one or more servers or electronic storage. In one embodiment, the server is a server device connected to the client via a LAN or WAN, or also a cloud server. In one embodiment, the system is configured for web-based access by a user, so that user input is received via a web-portal and information is processed on a remote terminal (such as a server or a remote client device) separate from the user device.

In one embodiment, the system comprises a computer-implemented program for execution on the client terminal. In another embodiment there is provided a non-transitory computer-readable medium having recorded thereon a program that causes a portable device to execute the method comprising: generating one or more electronic tickets as part of a single locate request, the method comprising the steps of presenting an interactive interface, wherein the interactive interface is an interactive map presented on a display of a portable device; identifying, on the interactive interface, one or more of a user defined area, wherein the user defined area contains a site of a proposed excavation event; presenting the user defined area visually, such as by a line, and superimposed on the interactive map; transferring a set of geographic metadata associated with the one or more user defined areas from the portable device to a server wherein is stored a list of predefined area rules; analyzing the one or more user defined areas against a set of predefined area rules and upon analysis, calculating a value for each of the one or more user defined area, wherein the value represents a number of zones required per user defined area; sub-dividing each user defined area into the corresponding number of zones; analyzing each of the zones against a set of pre-defined zone rules and calculating a value that corresponds to one or more areas of notification within each zone, wherein the areas of notification correspond to an area for evaluation of the presence or absence of an underground facility; and generating an electronic ticket that corresponds to each of the areas of notification.

In another embodiment there is provided a non-transitory computer-readable medium having recorded thereon a program that causes a portable device to execute the method comprising A method for generating one or more of an area of notification, wherein the area of notification corresponds to a geographic area to be evaluated for the detection of an underground utility object in advance of an excavation, the method comprising: identifying a dig area on an interactive map displayed on a portable device, wherein the dig area corresponds to a site of a proposed geographic dig; collecting one or more of a set of geographic data corresponding to a boundary of the dig area identified on the interactive map, wherein geographic data comprises a location, a grid coordinate, an address, or a combination thereof; calculating an area for evaluation based on the geographic data points; applying a rules engine against the area for evaluation in order to calculate a value comprising a number of notifications required, wherein the rules engine comprises a database or other electronic storage of one or more of the following: data and information related to underground facility operators; and business rules or call center rules related to the management of locate operations by a One Call Center; dividing the area of evaluation into one or more of the area of notification according to the value calculated; and for each area of notification, generating, based on the analysis of the rules engine against the area for evaluation, one or more of an index of geographic data points corresponding to each area of notification; associating one or more of a unique identifier with each area of notification, wherein the unique identifier comprises a locate request ticket number, thereby creating an electronic record of the area of notification; and storing for later retrieval the electronic record, wherein storage may be local on the portable device or external on a server.

Exemplary Method and System Overview

Turning now to the Figures, which show various embodiments of an exemplary method and system as described herein.

FIGS. 1A-1K, collectively, represent an overview of an electronic ticketing system interface 100, configured to allow a user to perform various operations, including identifying a geographic dig area and creating various excavation entities to be evaluated for the detection of one or more of an underground utility object in advance of an excavation, and create an electronic record of ticket information and marking instructions related to the locate request. In one embodiment, the mapping interface comprises a mapping screen and input means. The interface 100 is displayed on a portable device and is in communication over a network with one or more databases or electronic storage residing on one or more servers, and stores information related as a locate notice session record. The interface 100 is configured for display on a screen of the portable device and is configured with input means for input of data related to the excavation event for which a locate request is made.

FIG. 1A shows interface 100 configured with a user input field 102, wherein information is received related to the user, i.e., the person performing the locate request; an event input field 104, wherein information is received related to the excavation event (such as date, time, place); and one or more of a features tab 106, such as various analytics, modes, and reports the system is configured to generate. Information is input into the system by suitable input means, such as by way of a keyboard attached to the device, or by way of input on a touch screen.

Figure 1B:
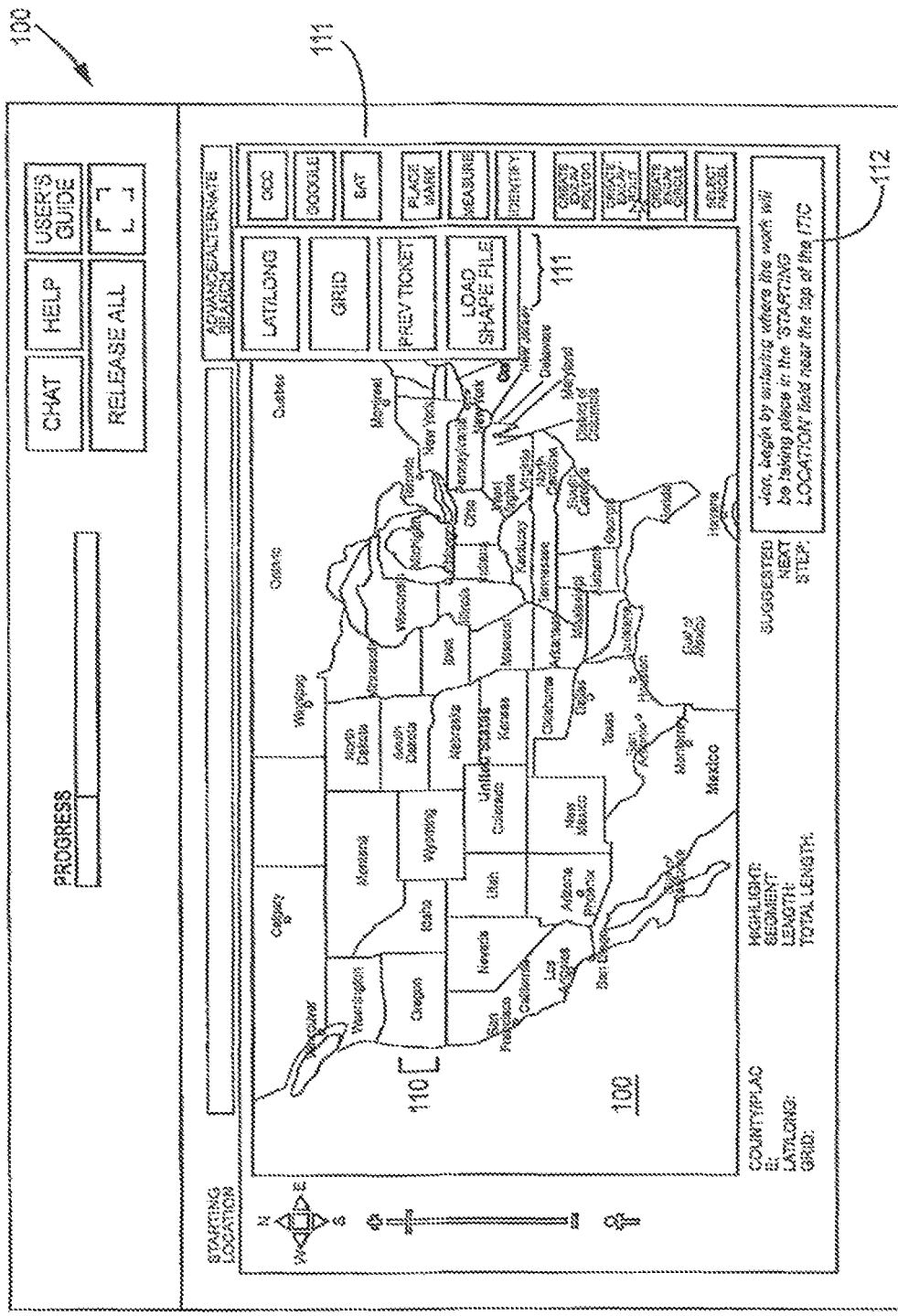

FIG. 1B shows an interactive map 110 of interface 100, wherein the map is an interactive map comprised of one or more layers of information, wherein mapping information related to the layers is stored in a database or other electronic storage and presented for display on the portable device, and configured for user input directly onto the mapping layers. Also shown are one or more of a functions tab 111, wherein the various functions, upon selection by the user, permit various activities, including but not limited to, the ability to display lat/long coordinates, a grid layer, preview a ticket, and/or load a shape file; and an input field for a suggested next step, wherein the suggested next step may be system generated based on user input or on parameters based on the rules engine 112.

Figure 1C:
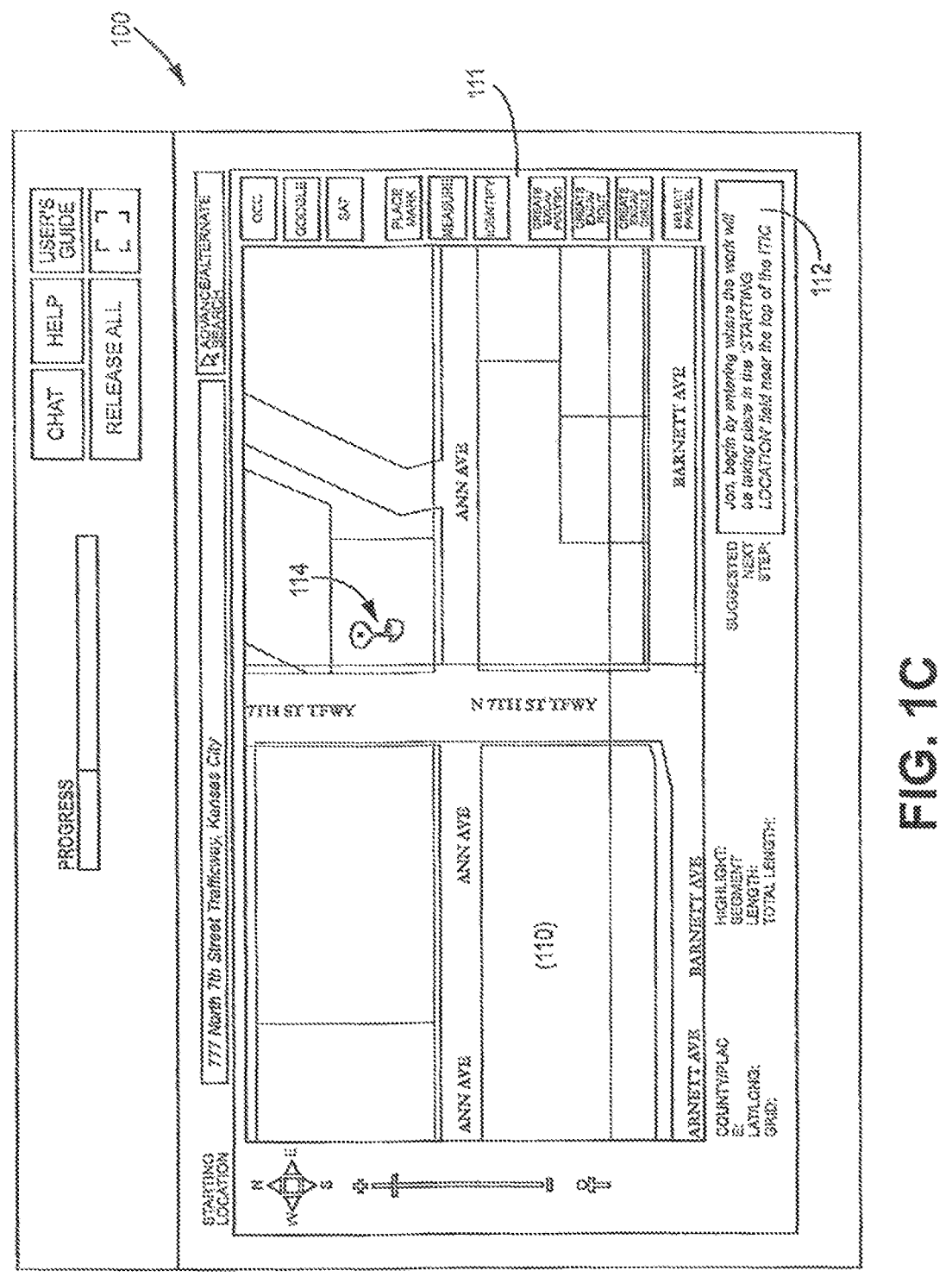

FIG. 1C shows map 110 of interface 100 configured with an input point 114, wherein the input point identifies a region at or near an excavation event on the map 110. Information related to the input point (address, lat/long points, and the like) may be stored in memory on the device or be transferred to memory in a database or other electronic storage and stored remotely on a server. Input point 114 is selected by the user by either selecting the point on the interactive map, such as by click of a cursor to a particular point on the map; alternatively by manual entry of address into a text input field, which then permits the system to identify the region on the map based on the address provided.

Figure 1D:
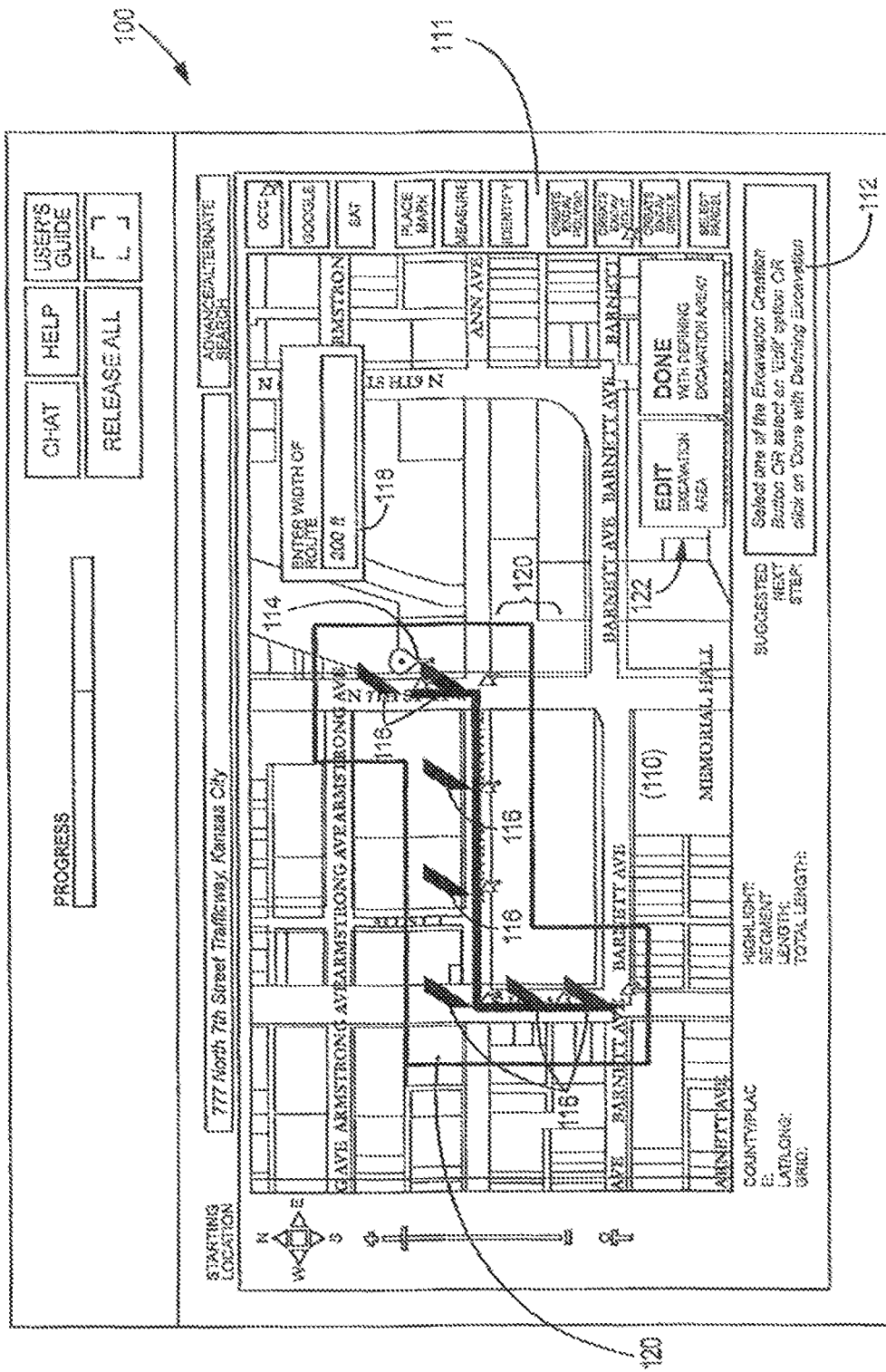
Figure 1E:
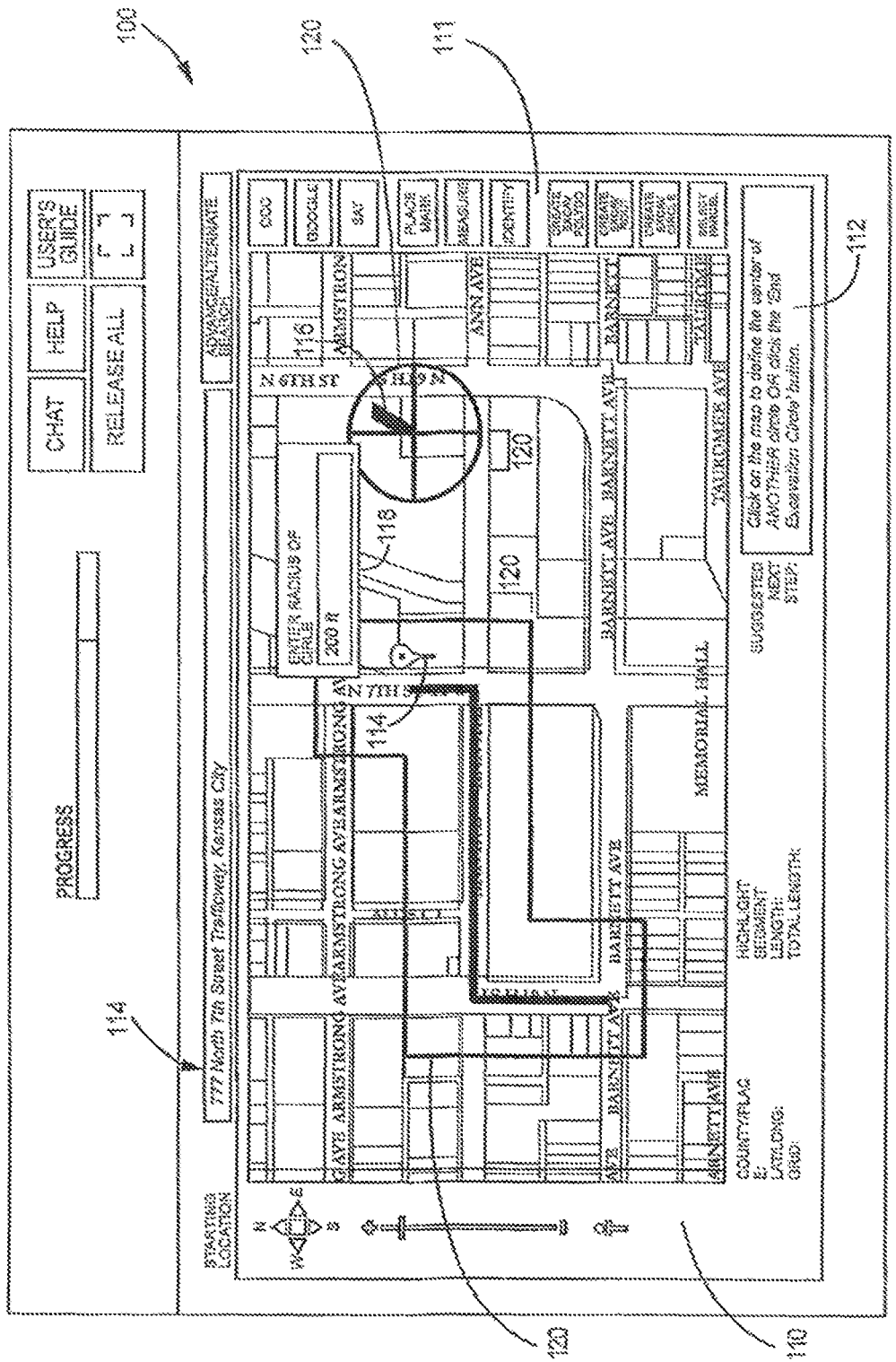
Figure 1F:
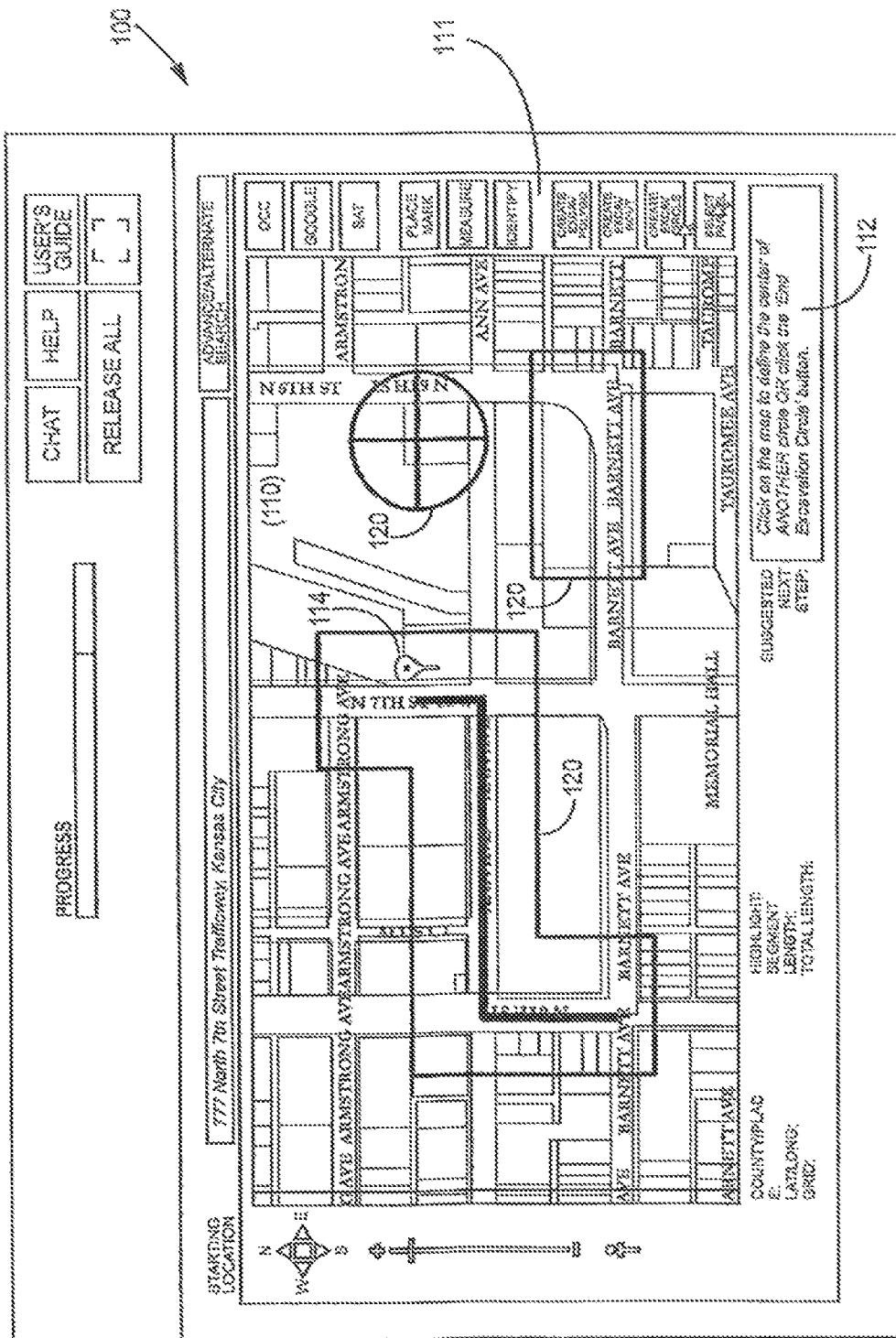

FIG. 1D shows map 110 on interface 100; an excavation entity input point 116, wherein the excavation entity may be of various forms as described herein, including but not limited to: a route, a circle, a parcel, a polygon and/or a feature. A parameter input field 118 is provided that permits the user to input particular information (such as a measurement) related to the excavation entity—for example, as shown in FIG. 1D; a parameter may comprise a width (in feet) for a route. Upon identification of one or more entity input points 116 and parameter input, such as width, the system then calculates a route area and presents an overlay image on the map in order to create an excavation entity 120, which is shown in FIG. 1D; the excavation entity comprises a route. Also included is an entity edit tab 122 that allows the user to manipulate or edit the route by adjusting the parameter input. Likewise, in FIG. 1E, an excavation entity 120 is shown in the form of a circle; with the parameter input 118 comprised of a radius. Based on the radius input by the user in the parameter input field 118, the system calculates an excavation entity of a circle of radius designated and displays the entity on the interactive map by way of an overlay image of the circle aligned with the input point. Similarly, in FIG. 1F, an excavation entity is shown in the form of a parcel 120.

Figure 1G:
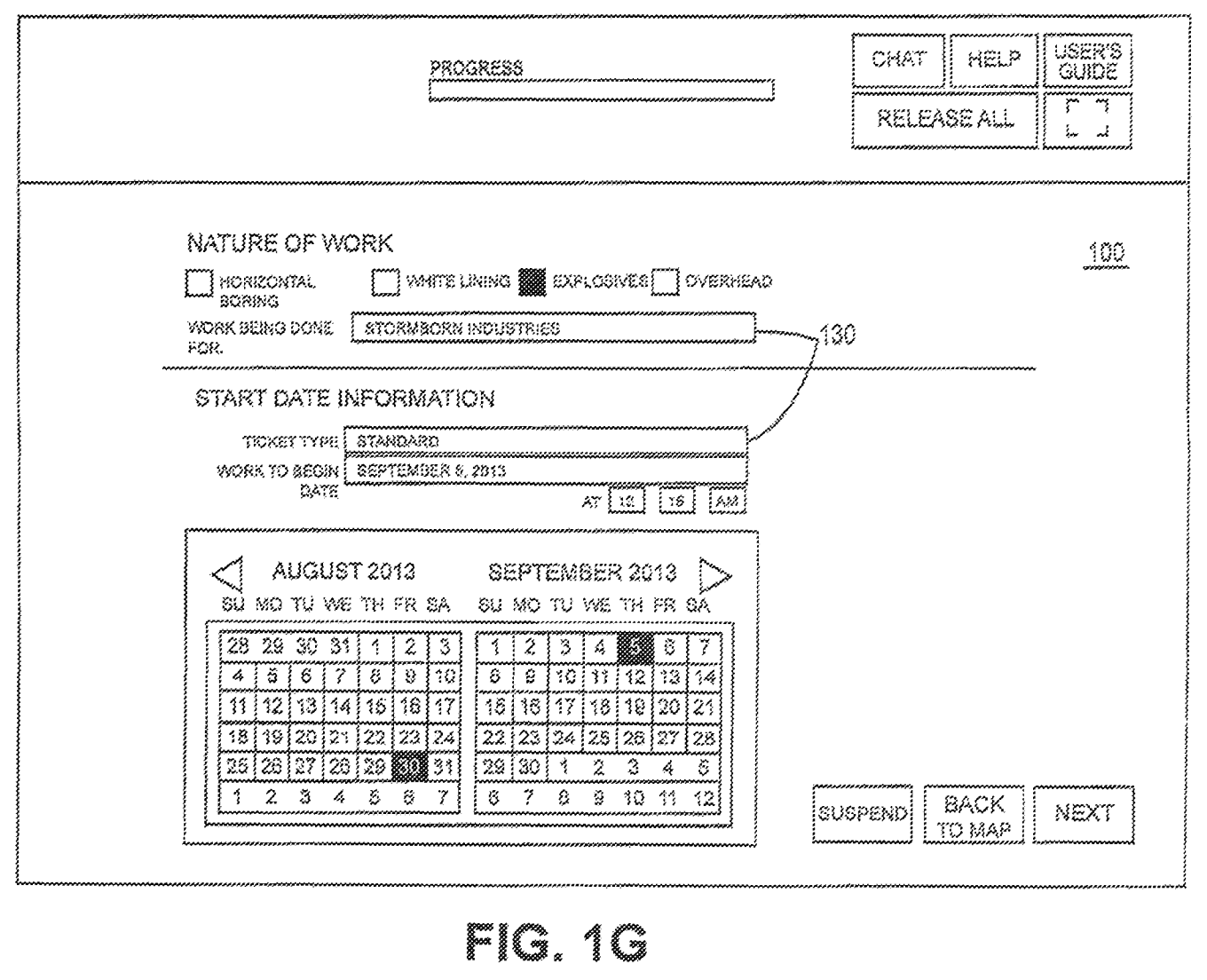

FIG. 1G shows interface 100 configured with one or more event input fields 130, such as input for the nature of work (type of excavation) and/or event information (such as date/time). The information input is then stored in memory in association with the notice session record.

Figure 1H:
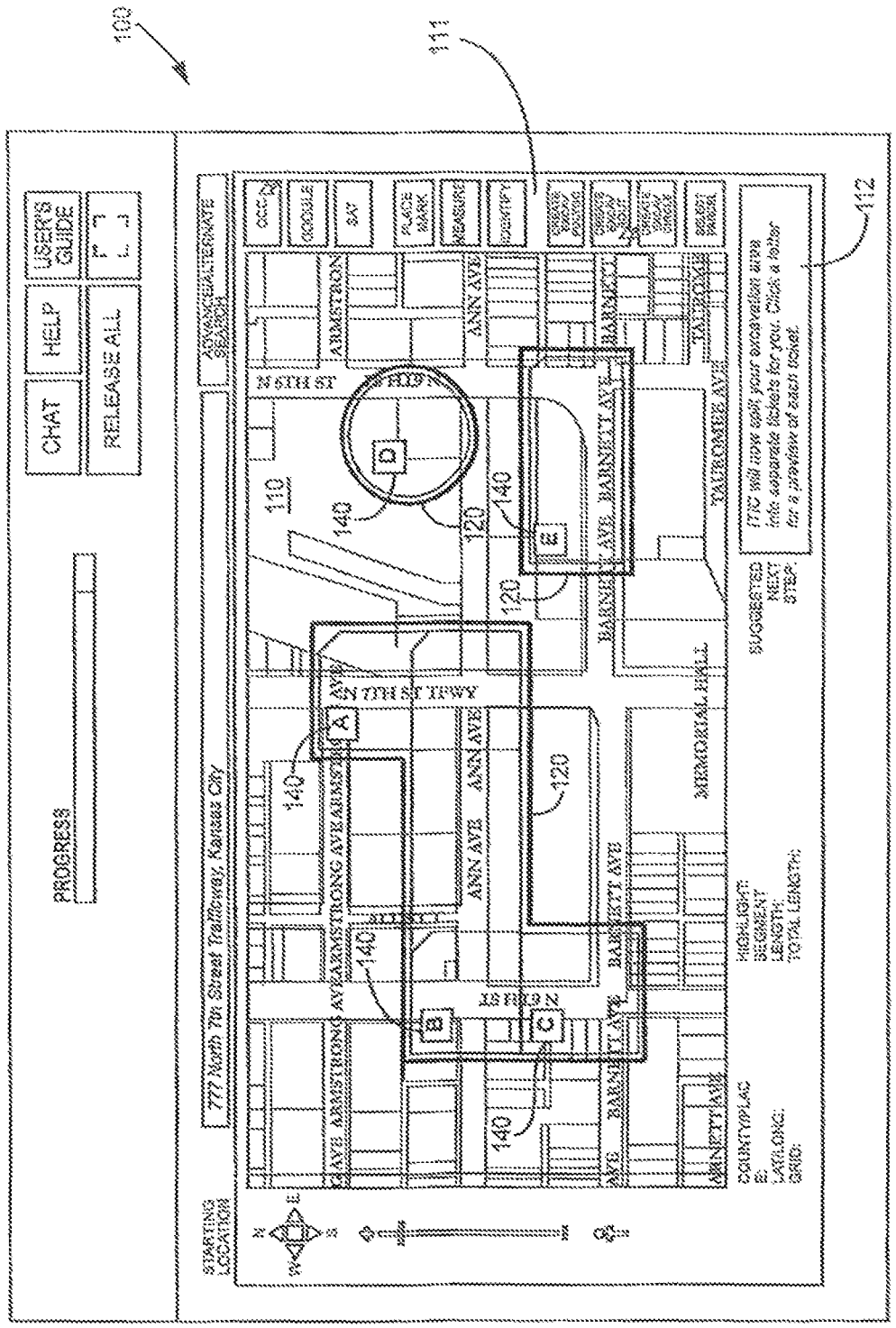

FIG. 1H shows one or more of the excavation entities 120 that have been analyzed against a rules engine stored on a database or other electronic storage and upon evaluation of the geographic area against the rules, sub-divided into one or more of an area of notification 140. In this particular example, information associated with the geographic boundaries of route excavation entity 120 have been transmitted to a server or other electronic storage and analyzed against the rules engine to determine if, based on call center rules, one or more locate requests may be associated with a particular area. In the example shown in the figure, upon analysis, route entity 120 is "split" into 3 areas of notification, designated A, B and C. The boundaries of each area of notification is identified on the interactive map 110, such as by an overlay in order to provide a visual display to the user. Information related to each area of notification 140 is stored in the database or other electronic storage and associated with the notice session record.

FIG. 1I shows user interface 100 configured for auto-populating one or more fields including, but not limited to: an auto-populated user input field 102 for receiving information related to user; an auto-populated excavator information input field 160, for receiving information related to excavator; an auto-populated location input field 162 for receiving information related to location of the excavation event; an auto-populated marking instructions input field 164 for receiving information related to marking the area to be evaluated for underground utility objects; a ticket preview display 166 configured to show details related to the area of notification on a portion of interactive map 110 configured as a ticket preview 168.

Figure 1J:
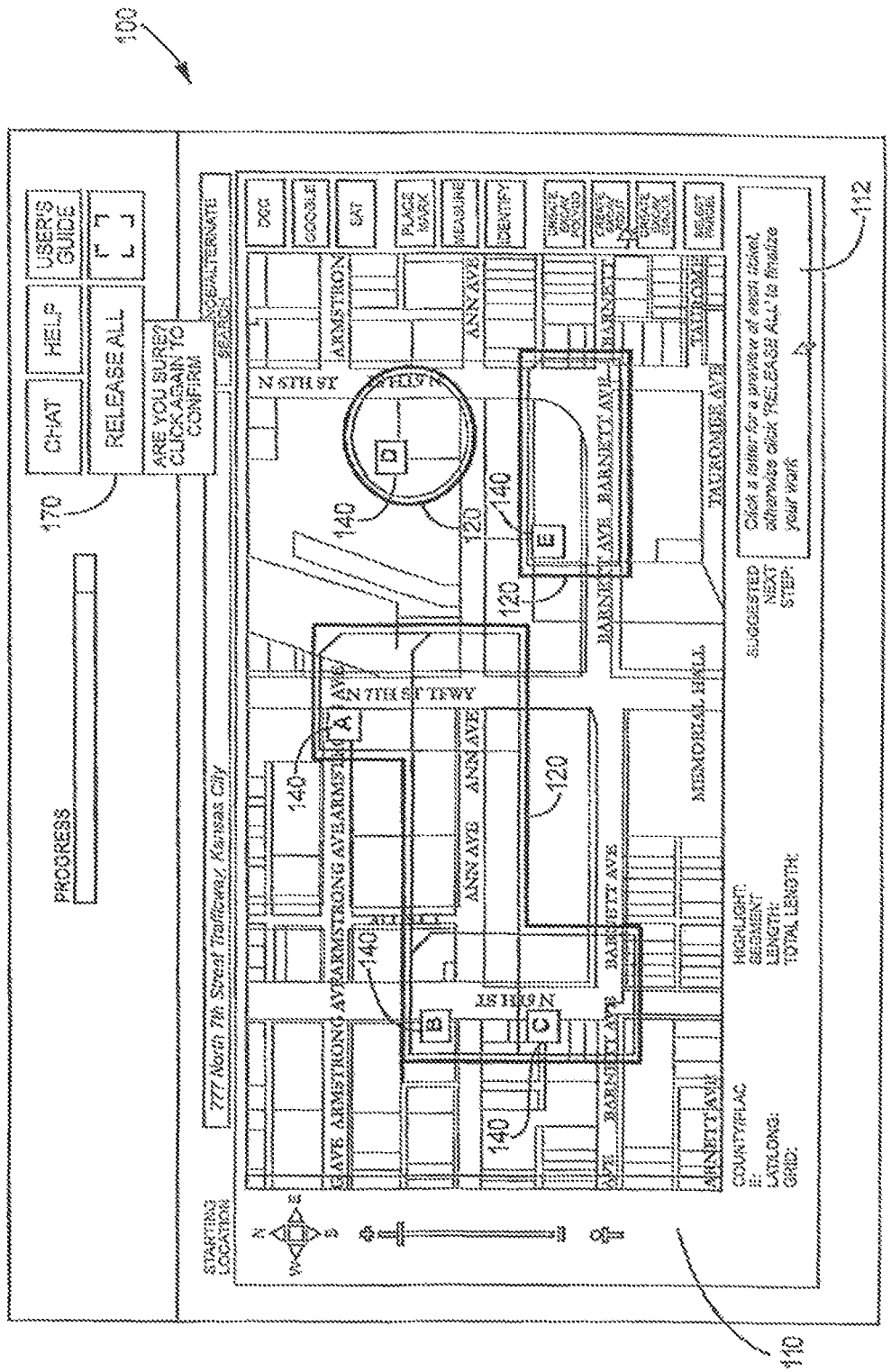

FIG. 1J shows interface 100 configured with a release tab 170 that releases all information associated with user; excavation; excavation entities; and areas of notification; and underground facility operators designated for each area of notification to be released to the system for creation of an electronic record of the notice session, and released to the respective underground facility operators identified by the locate request.

Figure 1K:
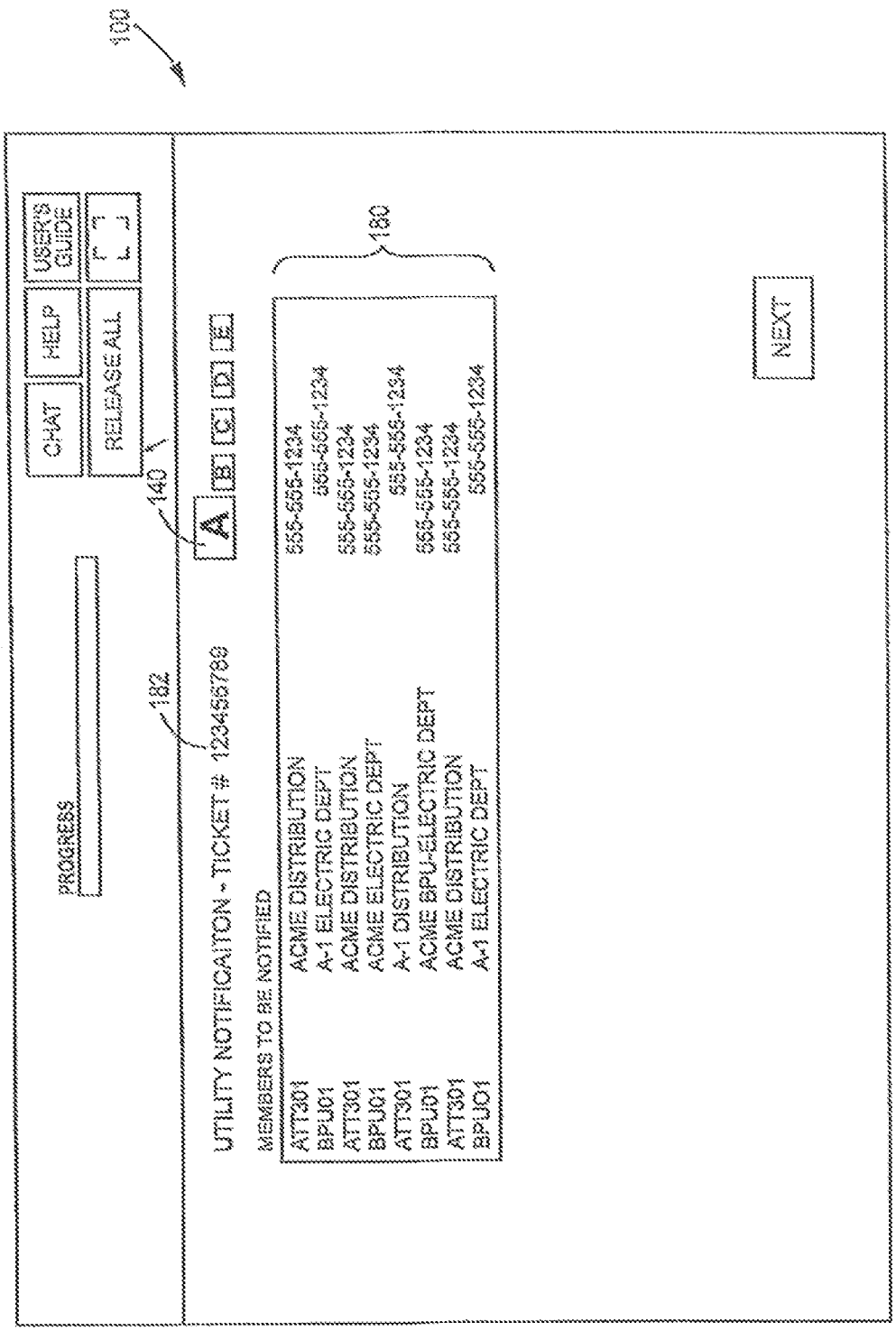

FIG. 1K shows a representative utility notification record 180 for area of notification A. The notification record for each area of notification may be assigned a Ticket Number 182. The notification record 180 includes a list of members (utilities) to be notified and telephone numbers, amongst other information associated with the record, such as marking instructions, excavation event information, and the like. Upon release of the tickets, the system is configured to send a confirmation receipt of the Notice Session and ticket information to the user, such as by electronic mail or other electronic means.

Figure 2:
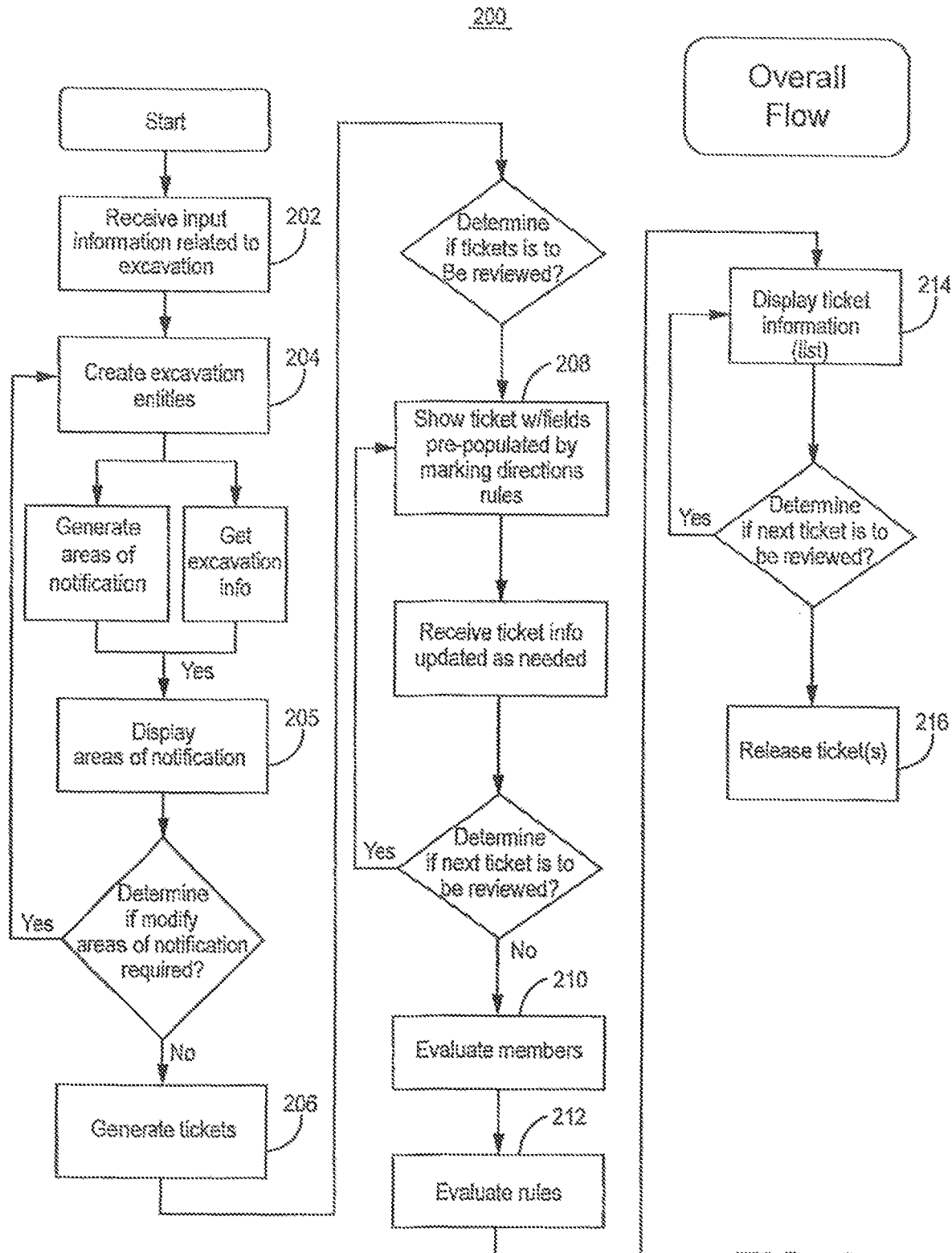
FIG. 2 shows an overview of a locate request ticketing system 200 according to one embodiment of the invention.

FIG. 2 shows an overview of a system 200 for locate request entry and method for creating one or more areas of notification associated with a locate request. Information related to an excavation is received via an input means into a portable device displaying an interactive map, at step 202. Excavation entities are created at step 204; and excavation info may be entered into the portable device via input means. The system is configured to display excavation entities and any areas of notification calculated for each excavation entity, at step 205. If no additional modification or entry of excavation entities is required, the process of ticket generation begins at step 206. The system provides fields for pre-population of marking instructions at step 208; ticket information may be updated via entry of information into portable device via input means at step 209. An evaluation step is performed at step 210 and a comparison of excavation entities against a rules engine at step 212. Once a ticket is created, the ticket information is displayed on a display screen of the portable device at step 214. An opportunity to view additional tickets is provided. If no further operations are to be carried on the ticket, the tickets are released (for example: released to the respective locate operator or facility owner) at step 216.

Figure 3:
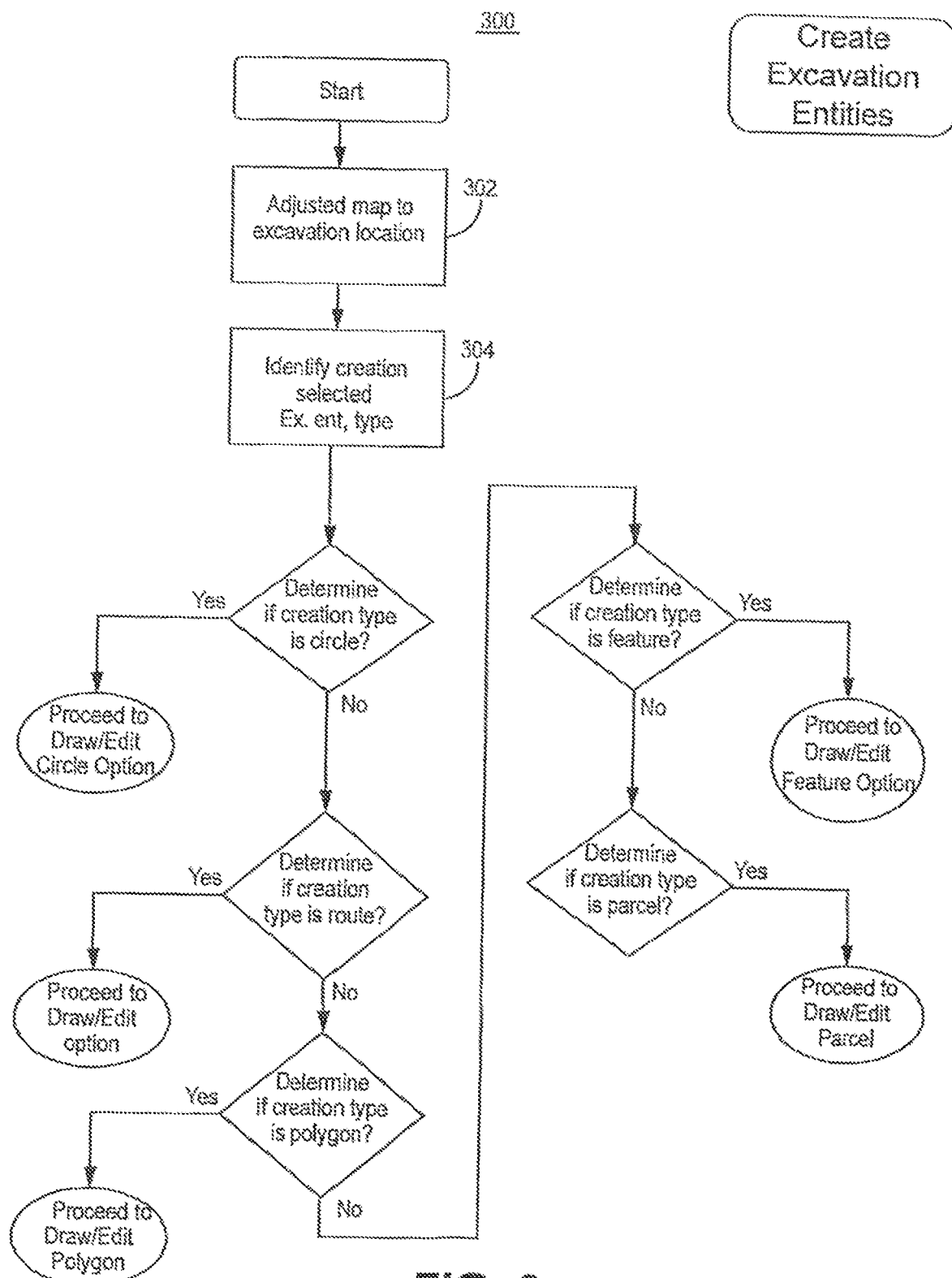
FIG. 3 shows an overview of a process 300 for creating excavation entities according to one embodiment of the invention.

FIG. 3 shows an overview of a process 300 for creating excavation entities. An interactive map is presented for display on a portable device and is adjustable to display an area containing an excavation area at step 302. Excavation entities are entered by user input by selecting the type of excavation entity from various options provided by the system, at step 304. Options include excavation entities comprising one or more of a circle, a route, a polygon, a feature or a parcel. Excavation entities are identified by selection on the interactive map via user input.

Figure 4:
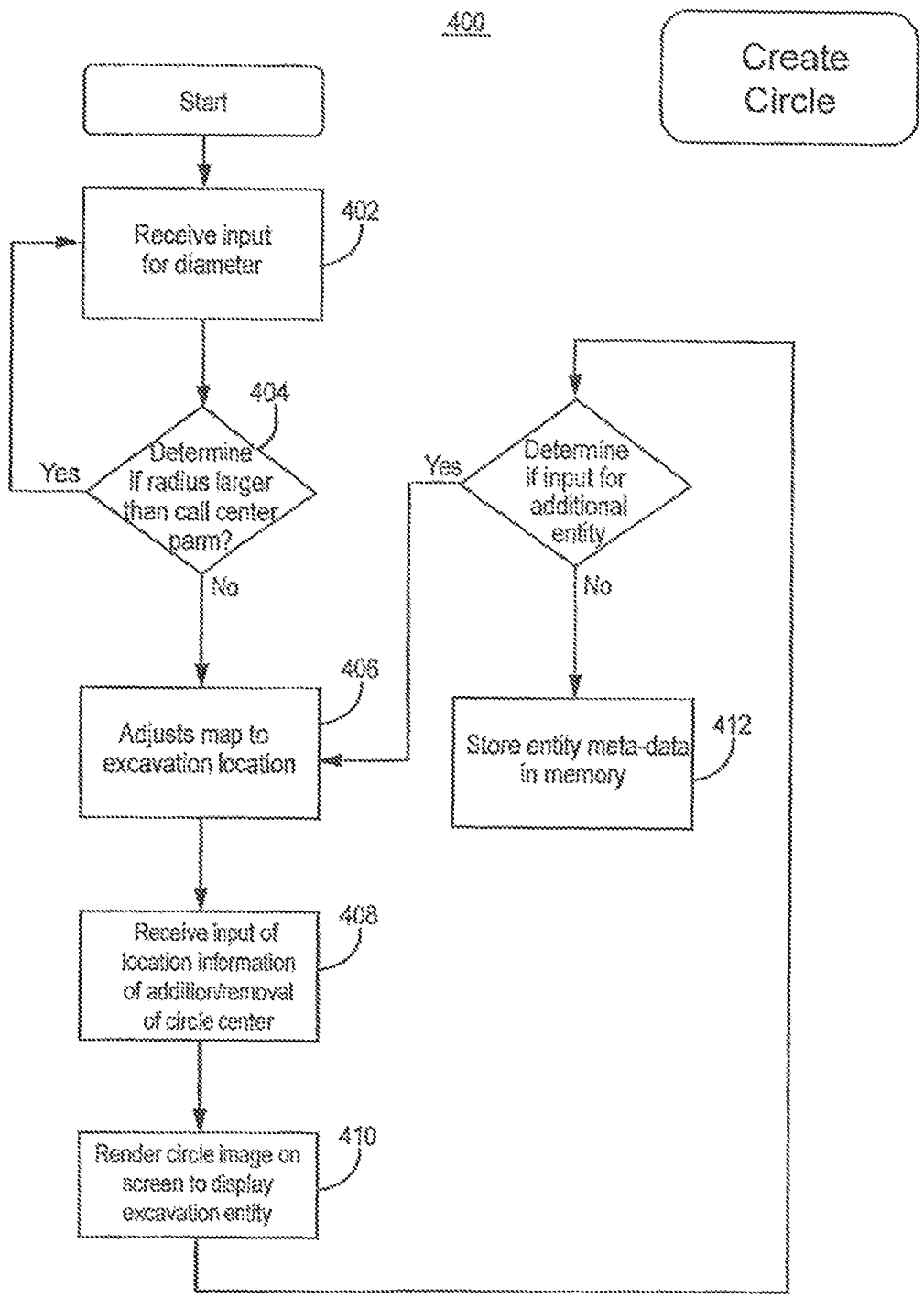
FIG. 4 shows an overview of a process 400 to draw or edit an excavation entity comprised of a circle, according to one embodiment of the invention.

FIG. 4 shows an overview of a process 400 for creating a circle excavation entity on the interactive map of the system. A diameter is input via input means into the portable device at step 402. A comparison is made to the diameter identified and to one or more of a call center parameter at step 404, and if so is modified by requesting a second diameter input. If the diameter is acceptable based on call center parameters, a circle center is identified on the interactive map at step 406 and an image of a circle corresponding to the diameter provided is rendered on the interactive map by an image overlay at step 410, wherein the image overlay corresponds to a geographic region on the interactive map that is identified by geographic coordinates. Meta-data associated with the geographic location of the circle image overlay on the interactive map is stored in a system database or other electronic storage at step 412.

Figure 5:
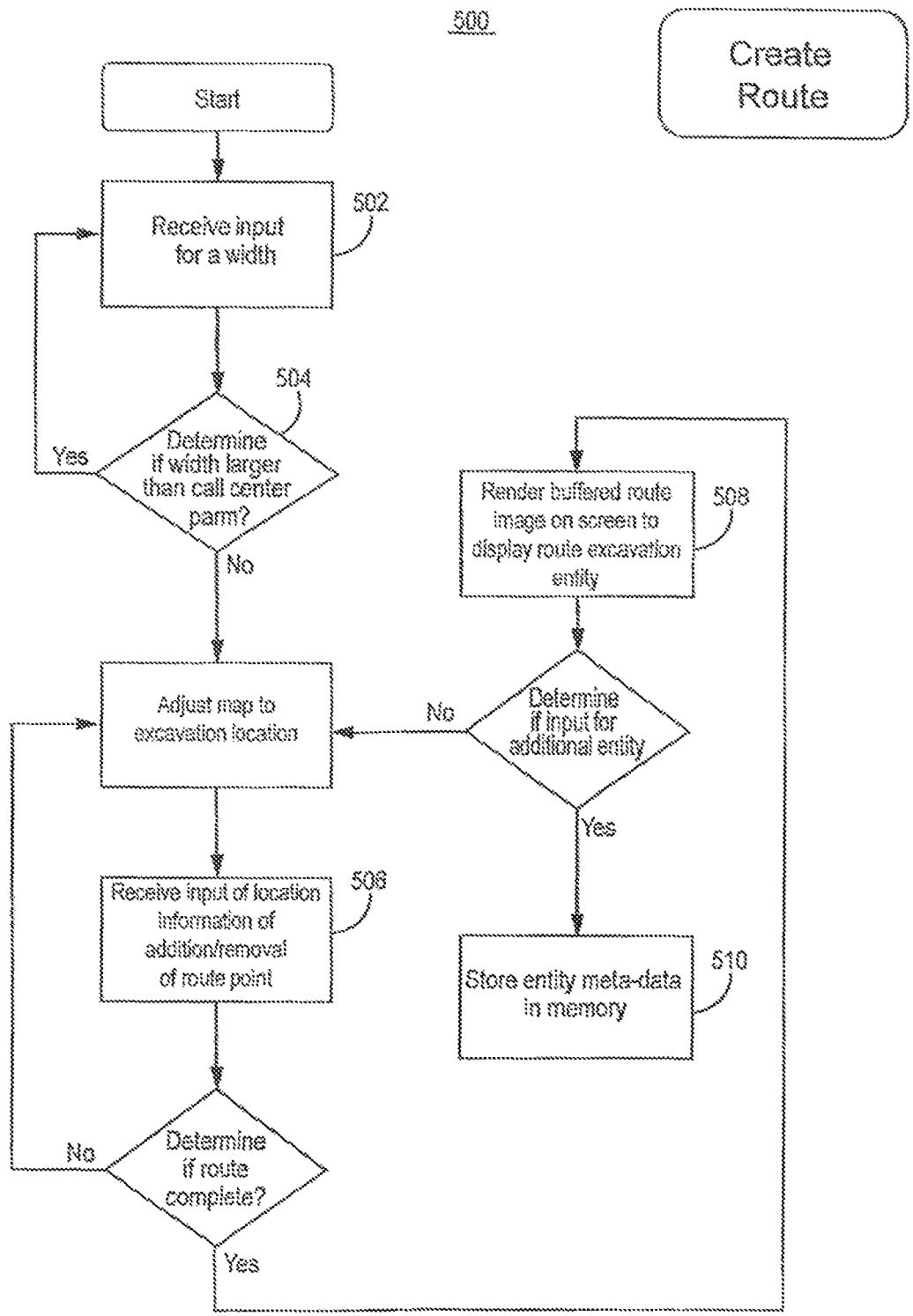
FIG. 5 shows an overview of a process 500 to draw or edit an excavation entity comprised of a route, according to one embodiment of the invention.

FIG. 5 shows an overview of a process 500 for creating a route excavation entity on the interactive map of the system. As part of the process 500 a width is input via input means into the portable device at step 502. A comparison is made to the measurement identified and to call center parameters at step 504, and if so is modified by requesting a second measurement input. If the measurement is acceptable based on call center parameters, a route point is identified on the interactive map at step 506 and an image of a route corresponding to the width provided is rendered on the interactive map by an image overlay at step 508, wherein the image overlay corresponds to a geographic region on the interactive map that is identified by geographic coordinates. Meta-data associated with the geographic location of the image overlay on the interactive map is stored in a database or electronic storage at step 510.

Figure 6:
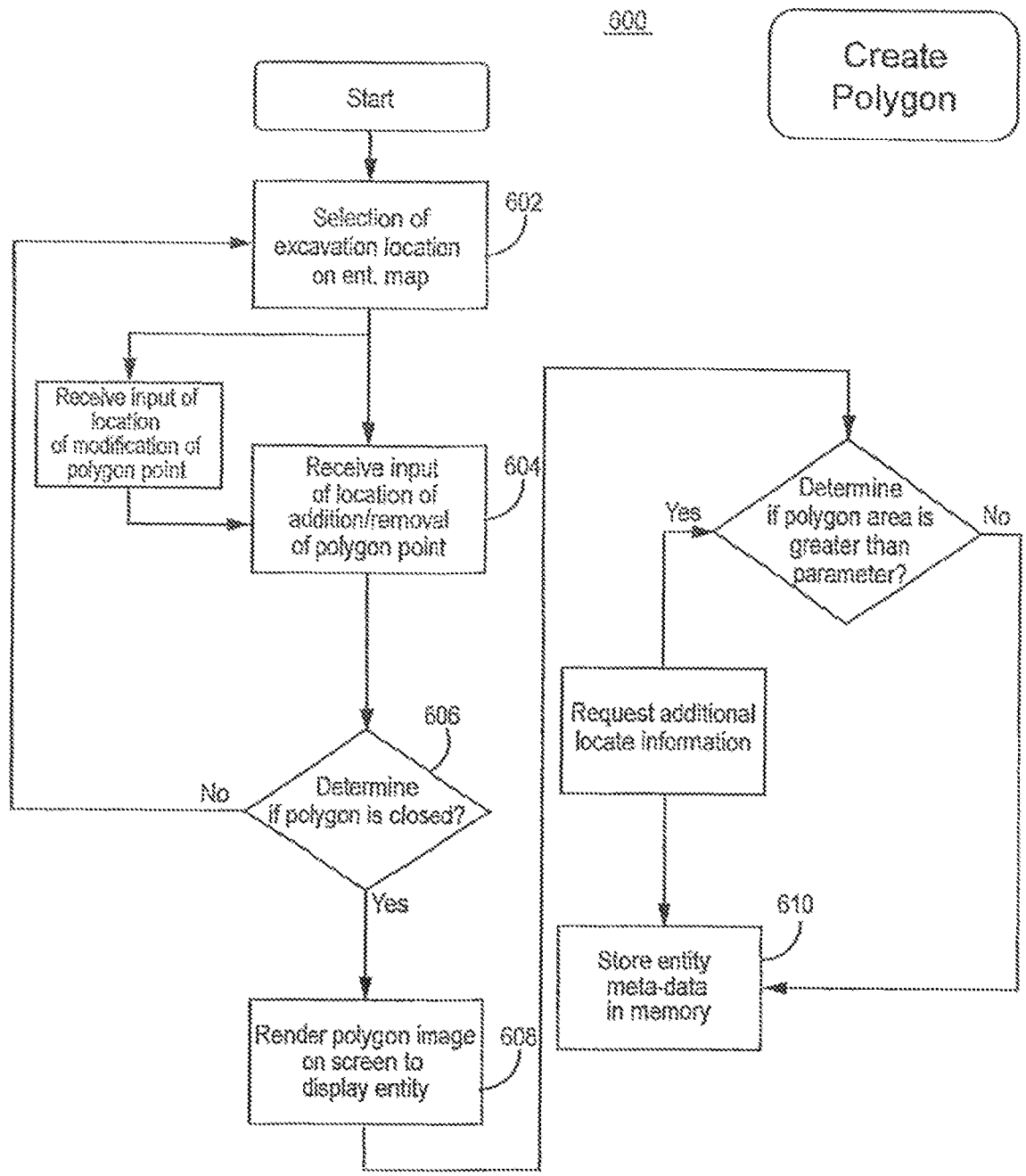
FIG. 6 shows an overview of a process 600 to draw or edit an excavation entity comprised of a polygon, according to one embodiment of the invention.

FIG. 6 shows an overview of a process 600 for creating a polygon excavation entity on the interactive map of the system. A point is input via input means into the portable device at step 602. A second point is received via input means at step 604, and additional points are received until the system confirms that the polygon is closed at step 606. A polygon is rendered and displayed on the interactive map at step 608 by an image overlay, wherein the image overlay corresponds to a geographic region on the interactive map that is identified by geographic coordinates. Meta-data associated with the geographic location corresponding to the overlay on the interactive map is stored in a database or other electronic storage at step 610.

Figure 7:
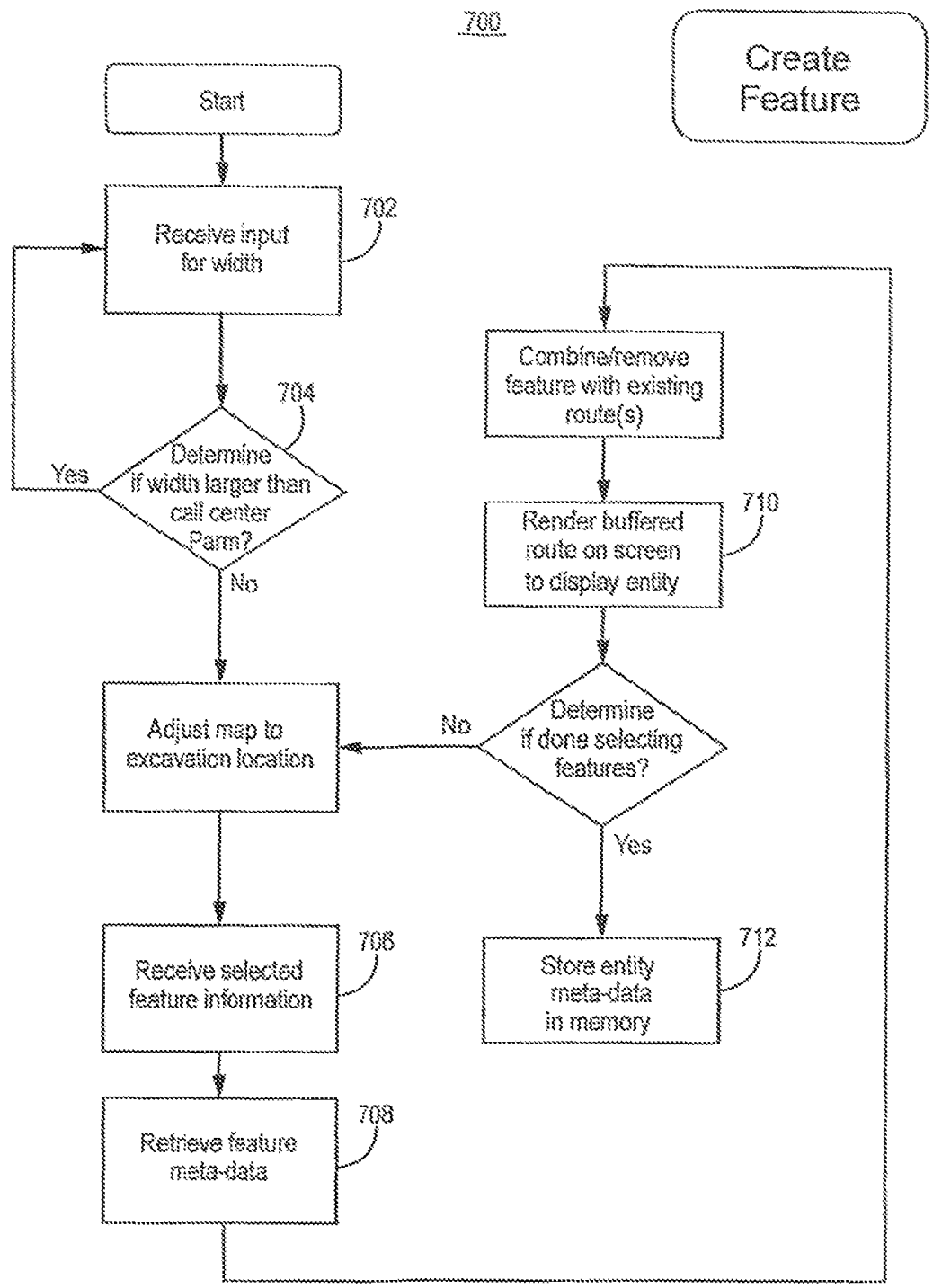
FIG. 7 shows an overview of a process 700 to draw or edit an excavation entity comprised of a feature, according to one embodiment of the invention.

FIG. 7 shows an overview of a process 700 for creating a feature excavation entity on the interactive map of the system. A measurement is input via input means into the portable device at step 702. A comparison is made to the measurement identified and to call center parameters at step 704, and if so is modified by requesting a second measurement input. If the measurement is acceptable based on call center parameters, then Metadata of the selected feature is retrieved at steps 706 and 708. The feature is then rendered on the interactive map by an image overlay at step 710, wherein the image overlay corresponds to a geographic region on the interactive map that is identified by geographic coordinates. Meta-data associated with the geographic location of the circle image overlay on the interactive map is stored in a database or other electronic storage at step 712.

Figure 8:
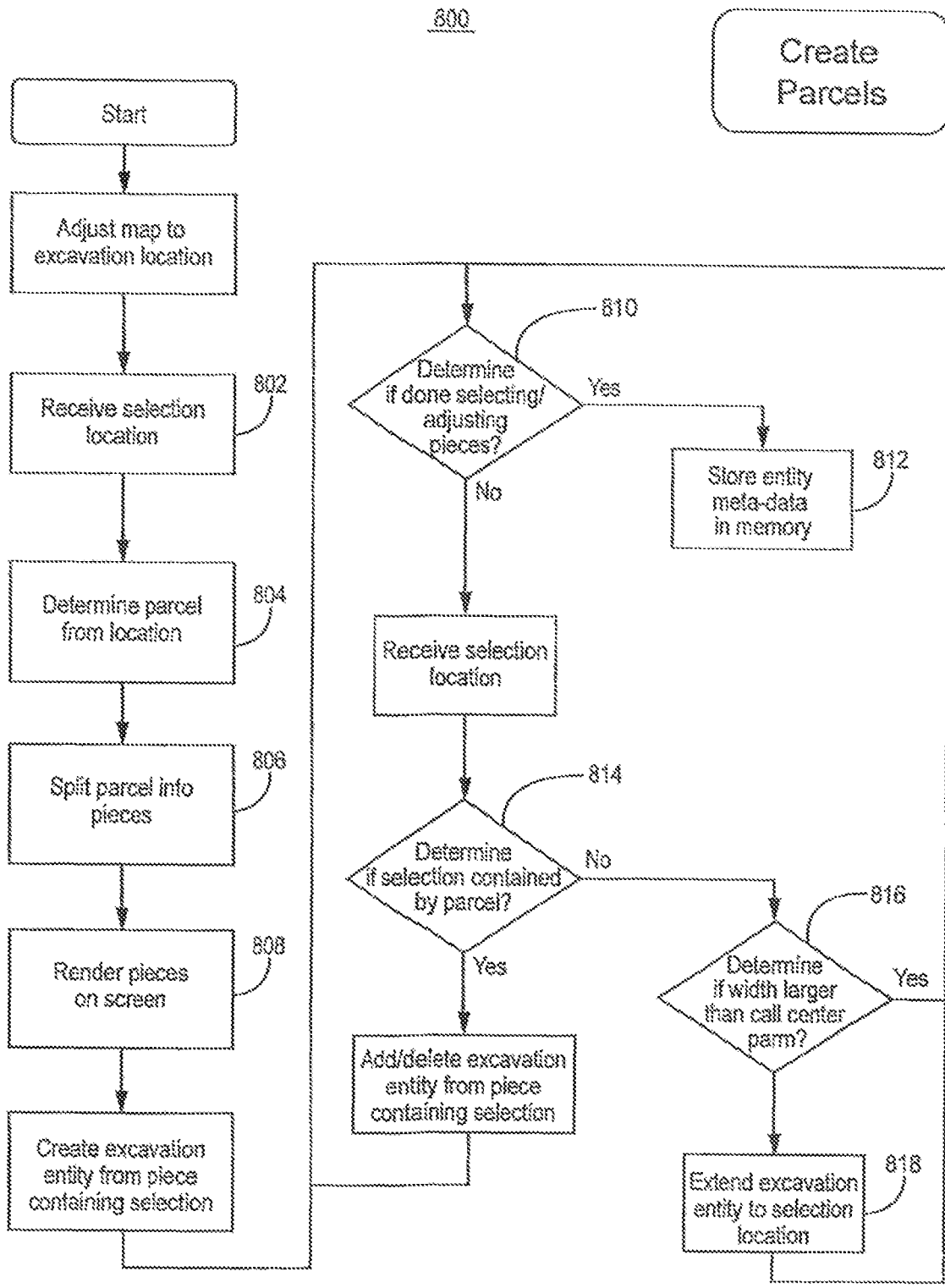
FIG. 8 shows an overview of a process 800 to draw or edit an excavation entity comprised of a parcel, according to one embodiment of the invention.

FIG. 8 shows an overview of a process 800 for creating a parcel excavation entity on the interactive map of the system. The interactive map is adjusted to excavation location and location information is input via input means into the portable device at step 802. Parcel information is determined based on parcel location information provided, at step 804. A parcel may be split or sub-divided into additional divisions at step 806. The resulting parcels are rendered for display on the portable device at step 808. Selection of additional parcels and subdivision of parcels occurs at step 810, and associated parcel meta-data is stored in a database or other electronic storage at step 812. If additional selections of parcels and/or parcel width extensions and/or adjustments are required at step 814, a comparison is made to the measurement identified and to call center parameters at step 816, and is modified to extend the excavation entity to the selection location identified on the interactive map at step 818.

Figure 9:
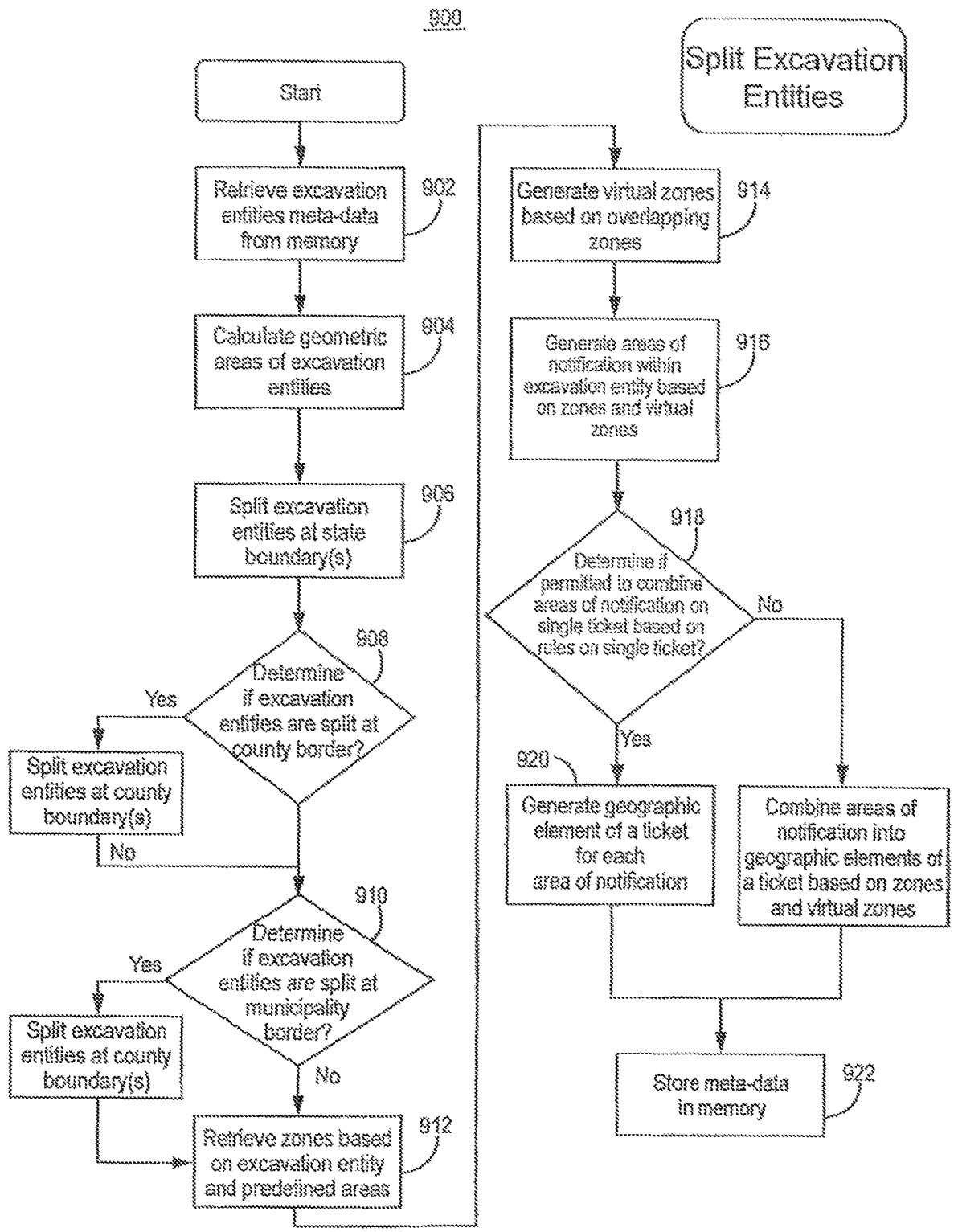
FIG. 9 shows an overview of a process 900 for subdividing excavation entities into areas of notification based on analysis performed in part by a rules engine, according to one embodiment of the invention.

FIG. 9 shows an overview of a process 900 for generating a ticket comprised of one or more locate requests comprising subdividing one or more of an excavation entity into one or more areas of notification. Meta-data corresponding to excavation entities is retrieved from system memory at step 902 and areas of excavation entities are calculated at step 904 and state boundaries residing within the excavation entities are identified at step 906. Excavation entities are further analyzed for county borders at step 908 and municipality borders at step 910. Excavation entities and areas are evaluated by a rules engine in order to determine a set number of zones, thereby generating one or more of an area of notification, in steps 912-916. The system then determines if multiple sub-entities and areas of notification may be combined on a single ticket at step 918. If so, then geographic data is generated for each area of notification at step 920 and stored, for example, as metadata in electronic storage at step 922, with the resulting metadata used to form an electronic record of the locate request.

Auto-Population of Locate Request Form and Exemplary Form-Creation Engine

A system and process for populating a ticket form for a locate request, based on user input, comprises an interactive mapping interface, a referential search, a referential distance, a marking instruction command and/or a table of marking instruction commands correlated to ticket number. In one embodiment, a location on a map is generalized based on a referential search parameter. Referential searches include formatted and unformatted address or intersection searches; latitude/longitude searches; searches based on previous ticket information; and/or grid search. Referential searches are used as part of a process for populating a ticket form.

In one embodiment, the process for populating a ticket form comprises a step of determining a county/parish. If a referential address or intersection is input into the system search field, and one of those referential searches contains an address or intersection that is fully or partially contained in or by any of the excavation entities (dig areas) OR is within a distance defined by a referential distance parameter, the associated county/parish is stored in a message, command or other format. Upon storing, the excavation entities associated with the ticket are analyzed to determine county/parish. If an additional county/parish is identified, it is recorded and stored in a format, such as message:county. If more than one county/parish is involved, the system determines which county/parish contains the majority of the excavation entities based on square area; in turn this is stored. Other counties/parishes are stored in a format that will link multiple counties/parishes to the ticket number. A separate parameter (allow multiple counties/parishes on one ticket) may be utilized to determine if additional analysis is to be performed.

In one embodiment, the process of populating a ticket form comprises a step of determining a city/place. If a referential address or intersection is utilized as input into a search field and one of the referential searches contains an address or intersection that is fully or partially contained in or by any of the excavation entities or is within a distance defined by the referential distance parameter, then a city/place format is stored. If another city/place is identified, a calculation is undertaken to identify the city/place containing the majority of the excavation entities based on square area. This city/place format is then stored. All city/places are stored in such in order to link multiple city/places to the ticket number. A separate parameter (allow multiple city/place on one ticket) may be utilized to determine if additional analysis is to be performed. Where a geographic area is not part of a valid city/place, a separate step of determining the closest city/place from each of the excavation entities is performed and stored.

In one embodiment, the process of populating a ticket form comprises a step of determining an address and intersection. If a referential address or intersection is input into the search field, and one of the referential searches contains an address or intersection that is fully or partially contained in or by and of the excavation entities or is within a distanced defined by a referential distance parameter, then the referential address is stored containing a street/cross street element field, or other attribute or identifying parameter.

In one embodiment, if one or more of a previous ticket was input into a search field and the system validates the county and city/place and the street/cross street elements defined in one or more previous tickets is contained in or by any of the excavation entities for this ticket or is within a distance defined by the referential distance parameter then the values for the street/cross street field are pulled from the previous ticket and populated as appropriate for the ticket.

In another embodiment, if no values are specified for the street/cross street field on the ticket, then the system identifies the largest excavation entity to be included on the ticket. If the excavation entity is a parcel or within a parcel and the parcel has an attributed street address, that value is assigned to the entity in order to store an entry for street/cross street. If a plurality of parcel entities exist and those parcels are contiguous, the system is configured to use the lowest and highest parcel numbers for an identifier—thereby defining a house number range.

In one embodiment, the system maintains a list of unused names in order to determine if a road feature has a valid/usable name. Examples include, but are not limited to: unknown; unnamed; ramp; driveway; alley. In another embodiment, where the excavation entity is not a parcel, the closest intersection of two roads is determined to populate the street/cross street field for the ticket.

In one embodiment, the process of populating a ticket form comprises a step of determining a location of work or marking instructions. If the ticket is to contain more than one excavation entity, the quantity and type of the excavation entity is determined. For example: the command "this ticket contains multiple locations: 1 excavation route and 2 excavation circles" will be a set of marking instructions. Other marking instructions or commands may also be included depending on the circumstances of the locate request.

In one embodiment, marking instructions are presented first for the excavation entity with the largest square area. For each of the excavation entities to be included in the ticket, a set of instructions are carried out for each entity—based on the type of entity.

Exemplary Marking Instructions for Auto-Population of Locate Request Form

In one embodiment, a method for auto-generating one or more of a set of marking instructions for a locate operation comprises: retrieving metadata associated with an excavation entity for storage in memory; determining ticket information for one or more of an area of notification, wherein information comprises one or more of state, county, municipality, dig street address, dig street name, one or more of an intersection, one or more of a set of driving directions; retrieving a first area of notification from memory; determining, iteratively, if the area of notification is one of a parcel, a circle, a route, a feature or a polygon; generating, based on the determination of the area of notification, marking instructions wherein marking instructions comprise textual information in the form of directions for identifying the boundaries of a locate operation whereupon the physical locate marks are to be placed on the ground in order to identify an area to be evaluated for an underground utility; and storing marking instructions and associated metadata for later retrieval.

In one embodiment, the method further comprises: retrieving a user search history performed on a mapping interface during identification of one or more excavation entities. In one embodiment, the method further comprises: generating additional marking instructions based on excavation information and user input. In one embodiment, the method further comprises: generating additional marking instructions based on user search history. In another embodiment, the method further comprises: generating latitude and longitude coordinate marking instructions for any points referenced in marking instructions.

Exemplary marking instructions for various entity types are listed below; the example intending to be illustrative only and not exhaustive. In one embodiment, directions are based on 16 compass points and distance in feet or miles. The words "first" and "second" are used randomly for the purposes of the Examples. In the event a starting point for the first excavation entity described may only be reached by utilizing unnamed roads, the marking instructions will start by providing proper driving directions needed to locate the actual starting point. For instance—"from the intersection of Road A and Road B, proceed W for approx. 3000 feet on an unnamed road to another unnamed road; proceed S for approximately 890 feet on that unnamed road; the center of the first excavation circle is approximately 275 ft E and approximately 35 ft N of this point", etc.

EXAMPLES

Example A

Excavation Parcels

In one embodiment, in the event a ticket identifies a single excavation entity, the marking instructions may read "mark the entire lot at the address". If a plurality of parcels are involved, and the parcel has a specified address, the marking instructions may read "the second parcel is located at 'parcel address'; mark the entire lot". If the parcel does not have an address attribute, the parcel location will be described from the location of the nearest intersection of roads where both road features are named. For example, the marking instructions would read "the first parcel is located approximately 500 ft S of Road B on the E side of Road A; mark the entire lot".

Example B

Excavation Circles

In one embodiment, in the event the excavation circle is fully contained within a parcel, then the rules above in example A apply. A center point location is identified of the circle in reference to the closest corner of the parcel; a rectangular hull may be needed around the parcel if that parcel has more than 4 points, so that directional points NE, SE, SW or NW corner may be used. The marking instructions may read "the first excavation circle is inside a parcel of land located at 'parcel location'; mark an X (for example, 15) foot radius of a point located approximately 25 ft N and approximately 15 ft W of the SE corner of the parcel". The radius is defined by user input when the circle is generated, in this instance, 15 feet. If the excavation circle is not fully contained inside a parcel, the location of the center point of the circle may be defined in reference to the closest intersection where the roads are named. For example, "the center of the second circle is located at a point approximately 200 ft N and approximately 675 ft E of the intersection of 'Road A' and 'Road B'; mark a 15 ft radius around this point. The radius is defined by user input when the circle is generated.

Example C

Excavation Polygons

In one embodiment, an excavation polygon may be fully contained inside a parcel; the parcel is defined based on the rules in example A. Define the location of the starting point of the excavation polygon in reference to the closest corner of the parcel noting that a rectangular hull may be generated around the parcel if the parcel has more than 4 points in order to determine the NE, SE, SW or NW corner. The marking instructions may read "the first excavation polygon is inside a parcel of land located at 'parcel location'; starting at a point (point 1) approximately 25 ft N and approximately 15 ft W of the SE corner of the parcel, proceed approximately 20 ft N to a second point (point 2); from that point approximately 10 ft W to a third point (point 3); from that point approximately 20 ft S to a fourth point (point 4), then proceeding back to point 1; mark within this entire boundary". If the excavation polygon is not fully contained inside a parcel, define the location of the starting point of the polygon in reference to the closest named intersection. For example, "the center of the second excavation polygon is located at a point approximately 200 ft N and 675 ft E of intersection of 'Road A' and 'Road B'; starting at point 1 proceed approx. 400 ft N to point 2; from point 2 approx. 100 ft W to point 3; from point 3 400 ft S to point 4; then proceed to point 1; mark within this entire boundary".

Example D

Excavation Routes

In one embodiment, an excavation route may be initially based on an assumption that the excavation route would not be contained within one parcel. The starting point of a route is defined based on the nearest intersection of roads where both roads are named. A starting point is identified, followed by defining the points of the generalized route using 16 compass points and the distances between points. For example, marking instructions may read "the first excavation route begins at a point approximately 400 ft NNE of the intersection of 'Road A' and 'Road B'; from that point (point 1), proceed approx. 225 ft SE to a second point (point 2); then approx. 410 ft E to a third point (point 3); then approx. 1200 ft S to a fourth point (point 4); mark within ten (10) feet on both sides of this entire route". The width is defined by user input when the route is generated.

Example E

Feature Locate

An excavation entity may be created using a feature locate. A user selects an existing map feature to establish the route; once the route is designated a width is selected and applied in order to create an excavation entity polygon corresponding to the area around that feature. In this instance the marking instructions may specify the names of the features involved. For example, if the start of the feature locate is also an intersection, the marking instruction may read "starting on 'Road A' at a point approximately 200 feet W of 'Road B' proceed 800 feet E on 'Road A' to the intersection with 'Road C'. Mark the entire road right of way".

In one embodiment, each point number previously referenced in the marking instructions will be listed and stored in a table with a lat/long coordinate point. For example:
Point 1: Lat: 39 28' 11.20" Long: –97 39' 9.76"
Point 2: Lat: 39 28' 11.00" Long: –97 39' 9.85".

In one embodiment, a system configured for auto-populating one or more of marking instructions on an electronic ticket order form is comprised in part, by a method for generating marking instructions on the electronic order form, comprising: gathering information related to one or more areas of notification, one or more of a search history if available, and determining, based on the areas of notification an appropriate instruction for a locate operation corresponding to one or more of the areas of notification; and storing the auto-populated order form comprising marking instructions in an electronic storage for later retrieval or transmission to an operator, wherein the operator is the person or party responsible for performing or overseeing the locate operation to detect the presence or absence of an underground utility.

Turning again to the figures. FIGS. 10 A-C show an overview of an exemplary process for an auto-populated electronic ticket form comprising marking instructions for a locate operation. For each area of notification, marking instructions are generated and stored in association with ticket information for later retrieval, such as by a call center, an operator, an underground utility owner, or an excavator.

Figure 10A:
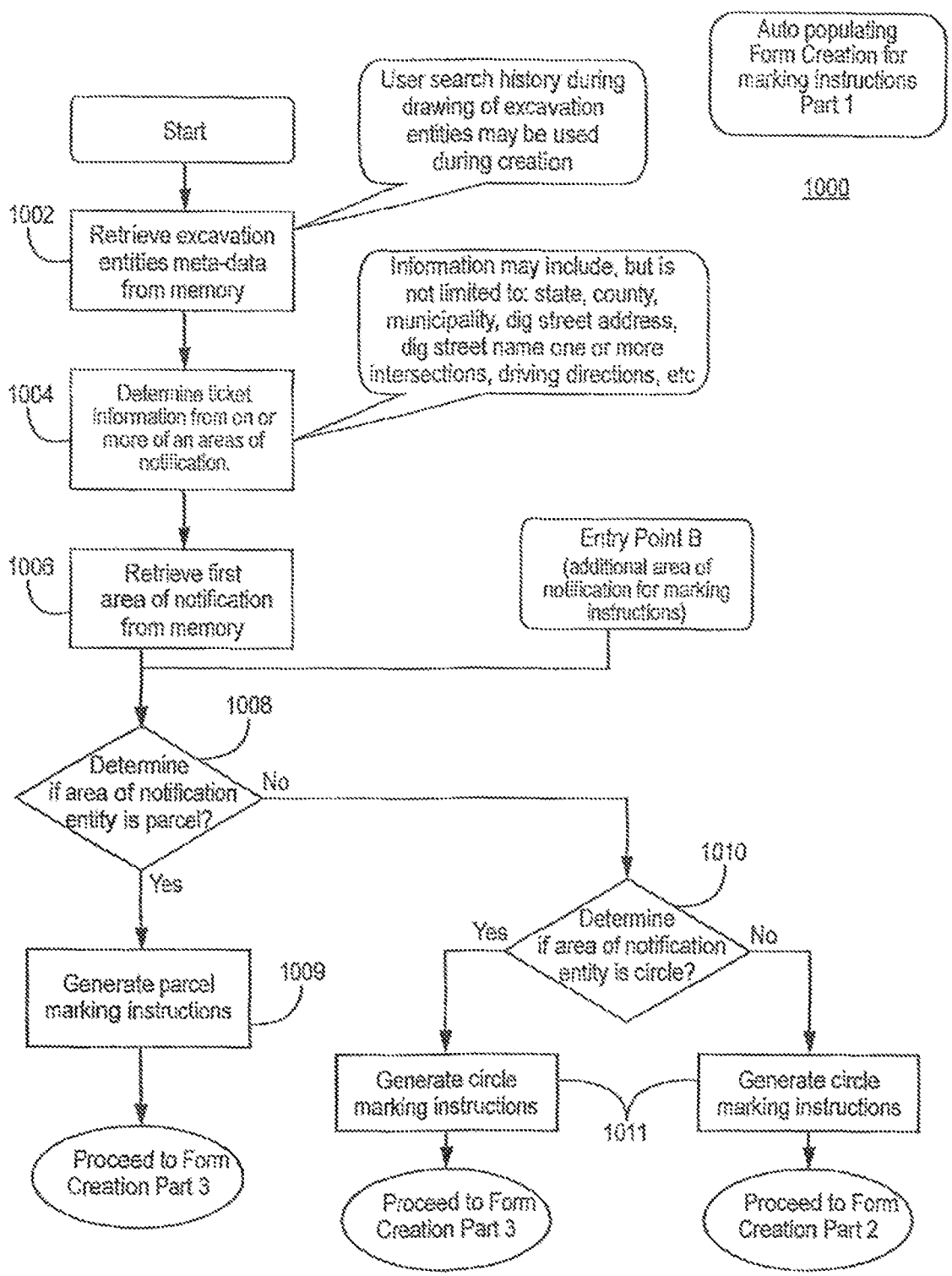
FIGS. 10 A-C show an overview of an exemplary process 1000 for creating a form for marking instructions for an excavation event, according to one embodiment of the invention.
Figure 10B:
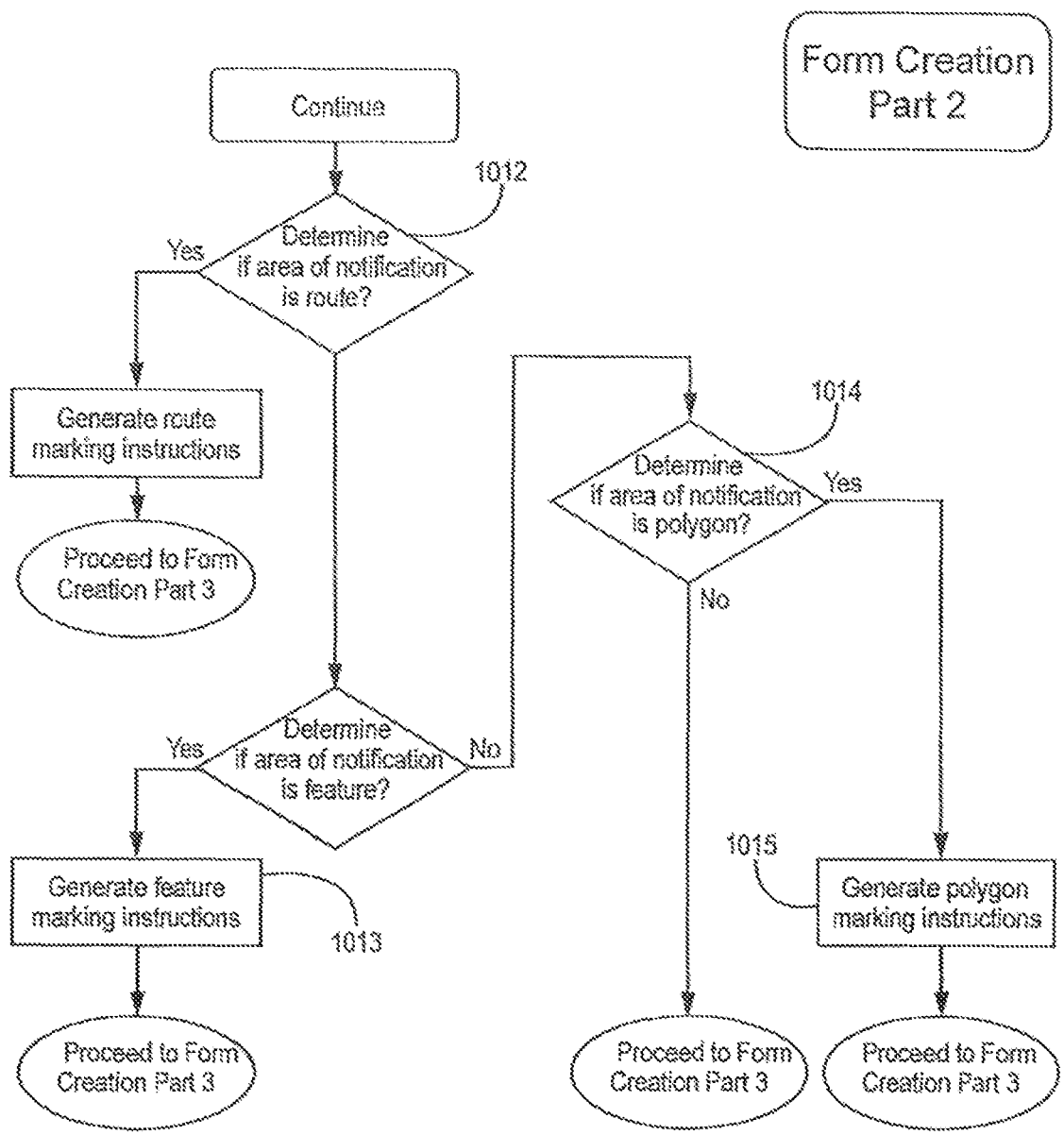
Figure 10C:
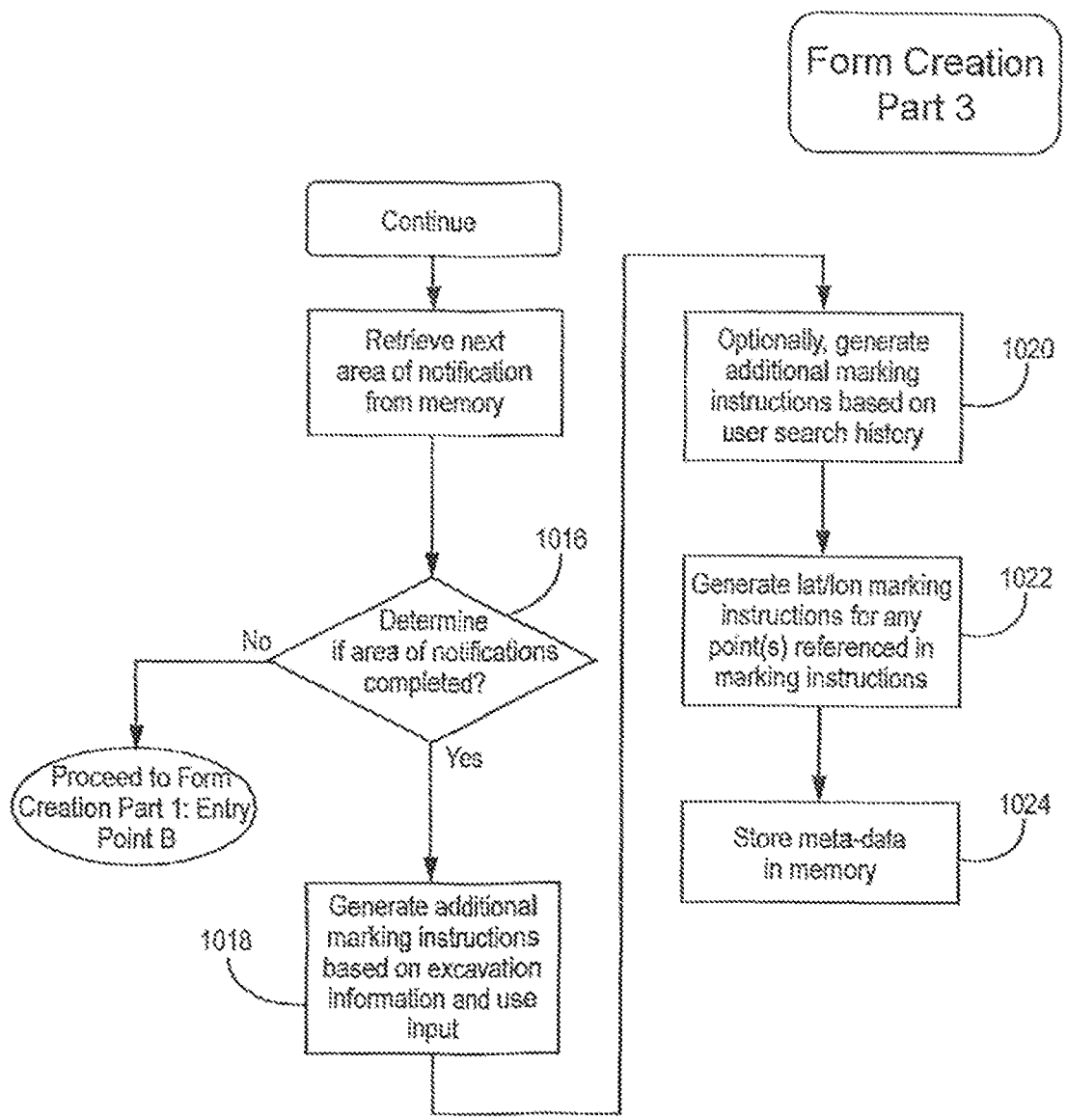
Figure 11:
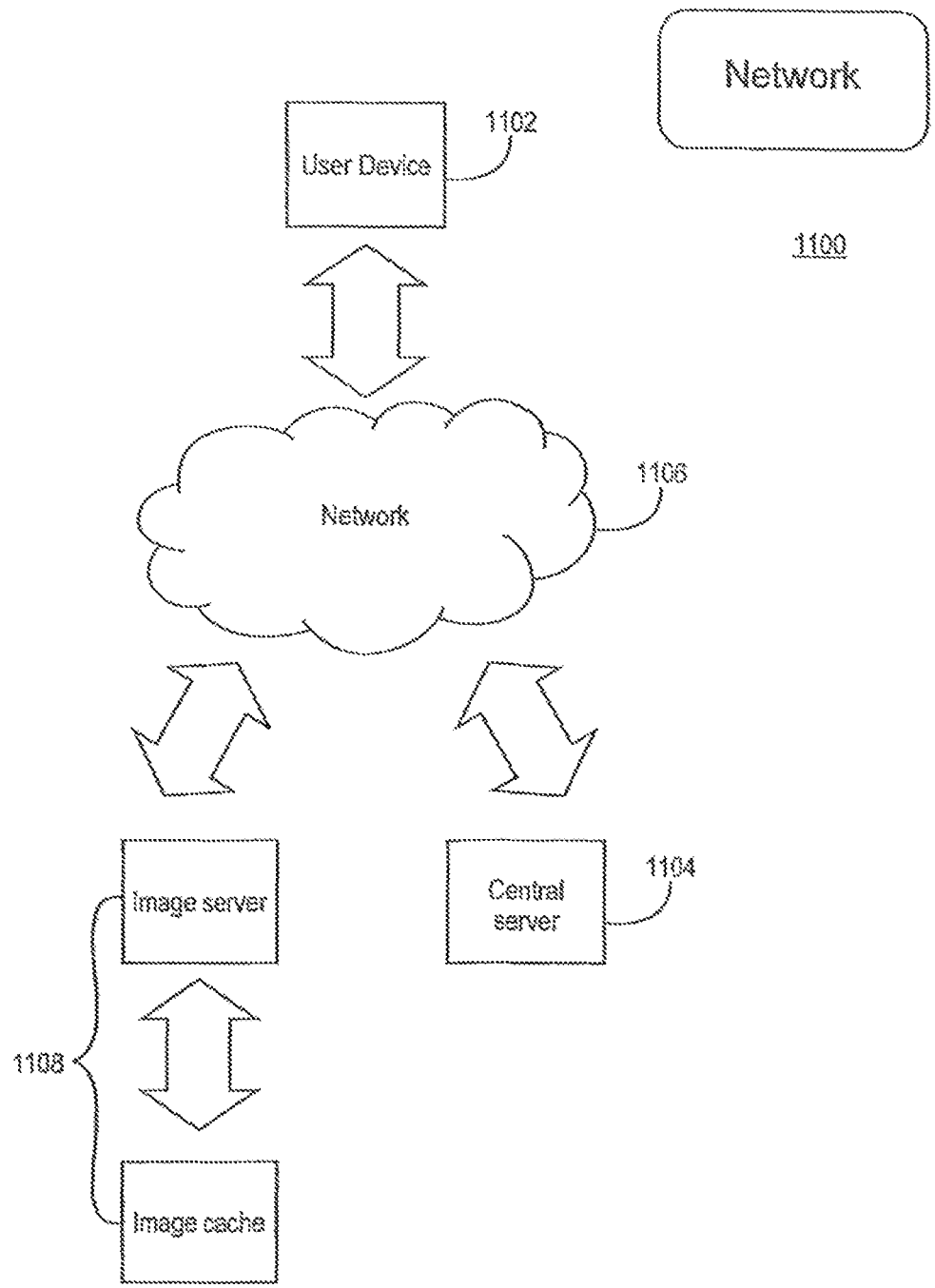

FIGS. 10A-10C show an exemplary process 1000 comprising retrieving excavation entity metadata from memory at step 1002; determining ticket information from one or more of an area of notification at step 1004, wherein ticket information comprises one or more of information related to state, county, municipality, excavation site address or name, one or more intersections, driving directions and the like; retrieving a first area of notification from memory at step 1006; determining, iteratively, if the area of notification is one of a parcel, a circle, a route, a feature or a polygon at step 1008; generating, based on the excavation entity of the area of notification, marking instructions (shown at steps 1009, 1011, 1013, and 1015, depending on the excavation entity) wherein marking instructions comprise textual information in the form of directions for identifying the boundaries of a locate operation to be performed, whereupon the physical locate marks are to be placed on the ground in order to visually identify an area to be evaluated for an underground utility; determining if excavation entities associated with request require instructions at step 1016; generating additional marking instructions based on one or more of a user-inputted parameter at steps 1018 and 1020; generating latitude and longitude coordinate marking instructions for any points referenced in marking instructions, at step 1022; and storing marking instructions and associated metadata for later retrieval at step 1024.

In one embodiment, a user-inputted parameter includes but is not limited to: retrieving a user search history performed on a mapping interface during identification of one or more excavation entities, excavation information and/or user input.

In one embodiment, the process of populating a ticket form further comprises a step of determining a set of latitude/longitude coordinates. If a referential address or intersection is input into the system search field, and one of those referential searches contains a lat/long coordinates as a referential search, and the lat/long point is contained by any excavation entity for this ticket, the information is stored as a unique identifier.

In one embodiment, the process of populating a ticket form further comprises grid information. If a referential address or intersection is input into the system search field, and the grid information is fully or partially contained in or by any excavation entity for the ticket or is within a distance defined by the referential distance parameter, the information is stored as a unique identifier.

Figure 11:
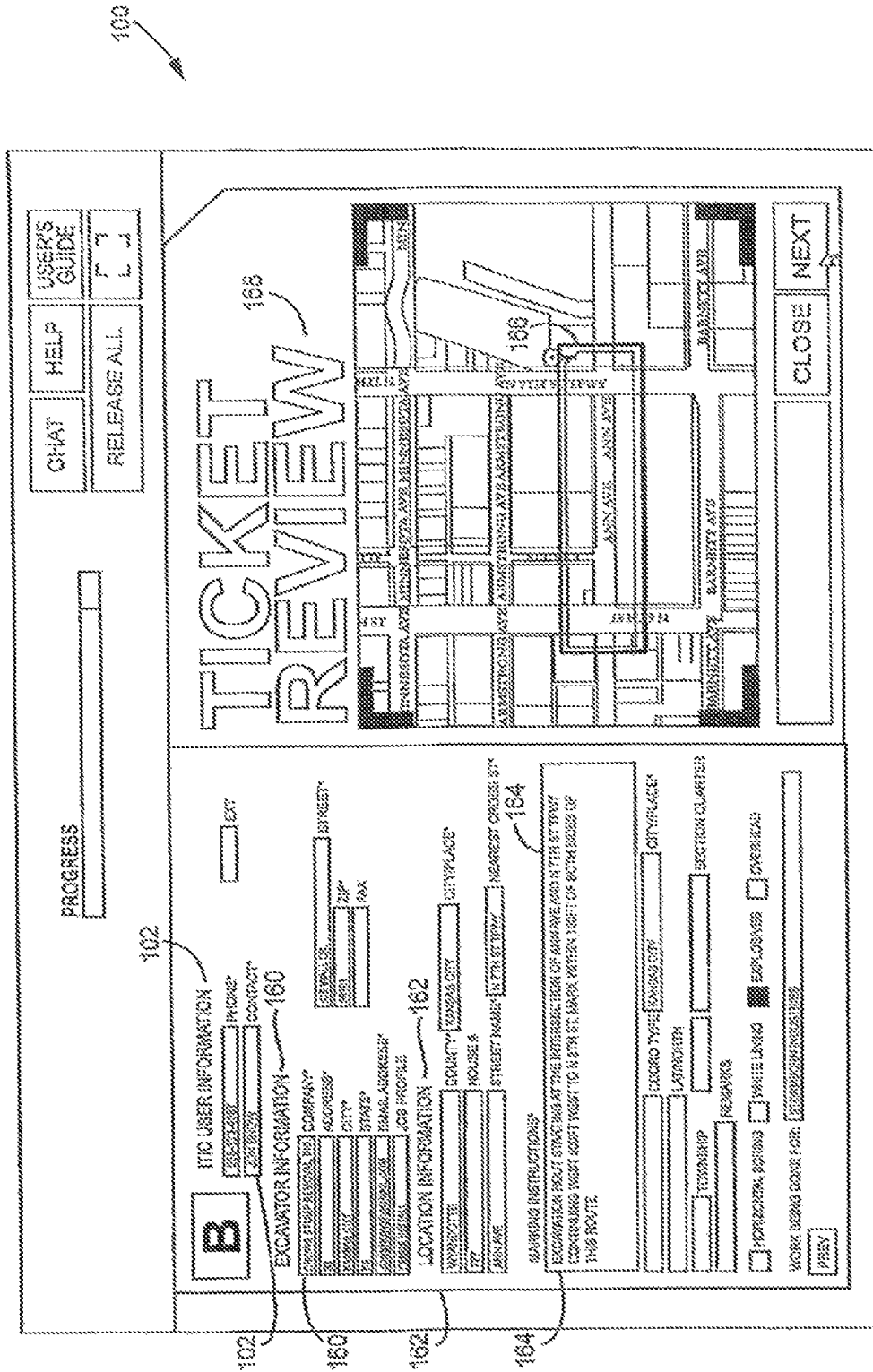
FIG. 11 shows an overview of an exemplary network environment according to one embodiment of the invention.

FIG. 11 shows an overview of an exemplary network environment 1100 according to one embodiment of the invention, comprised of user device 1102 in communication with a server 1104 over a network 1106 and one or more image servers 1108, including an image cache. In one embodiment the methods disclosed herein are configured as a program recorded to a non-transitory computer readable medium and are carried out on the user device 1102, such as a desktop, laptop, tablet or other portable user device configured processor capable of running the program. The program may be stored locally on device 1102 or remotely to a server 1104. The user device may include a processing unit; a memory; input means; output means, display screen and interface; and is in commutation with one or more servers 1104, 1108.

Figure 12:
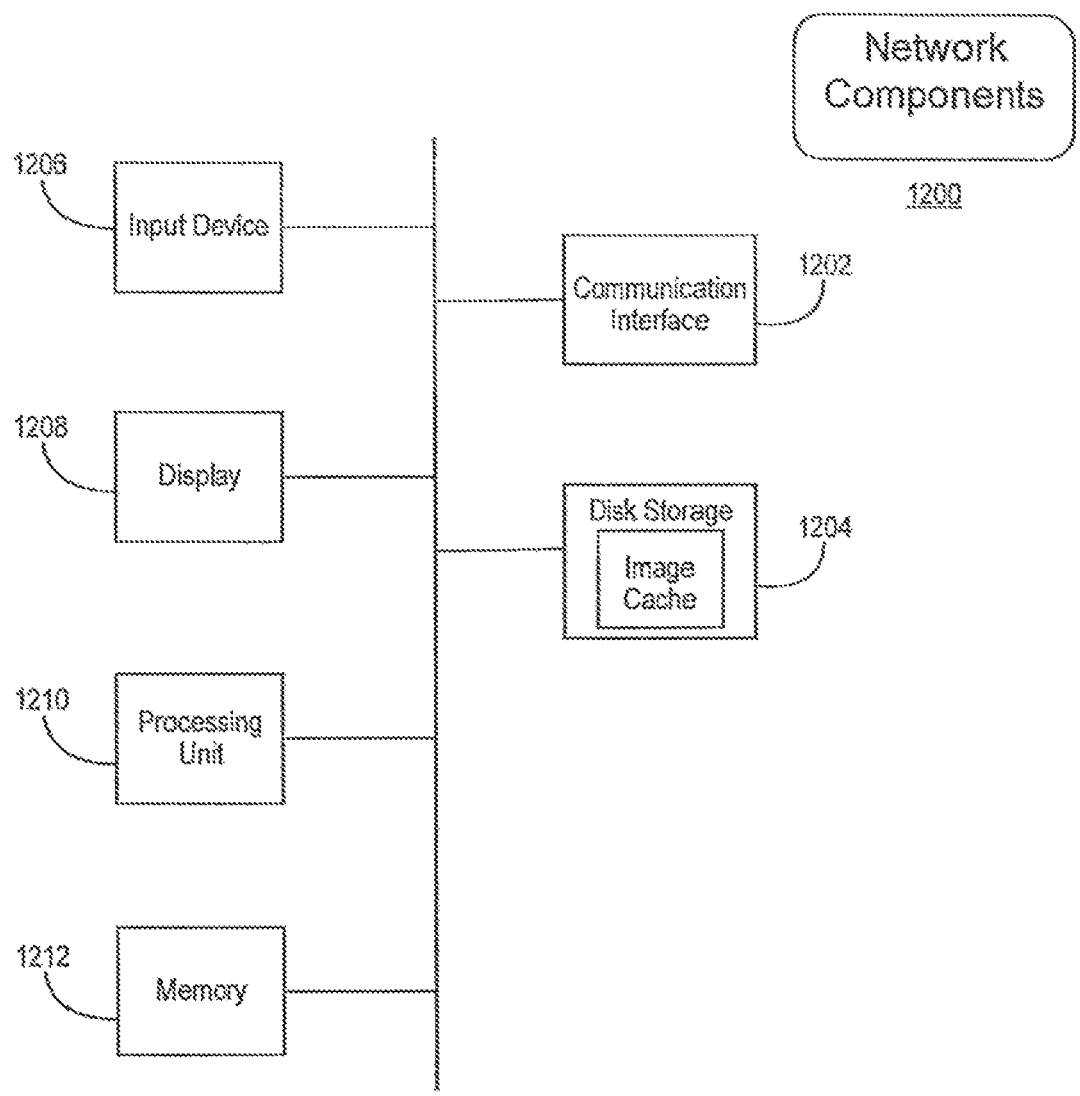
FIG. 12 shows an overview of exemplary network components of the environment of the invention.

FIG. 12 shows an overview of exemplary network 1200 components of the environment of the invention, comprised of one or more of a communication interface 1202, storage 1204, input device 1206, display 1208, processing unit 1210, and memory 1212. The processing unit 1210 is configured to interpret and execute instructions recorded on computer readable medium, instructions comprising the methods described herein.

Figure 13:
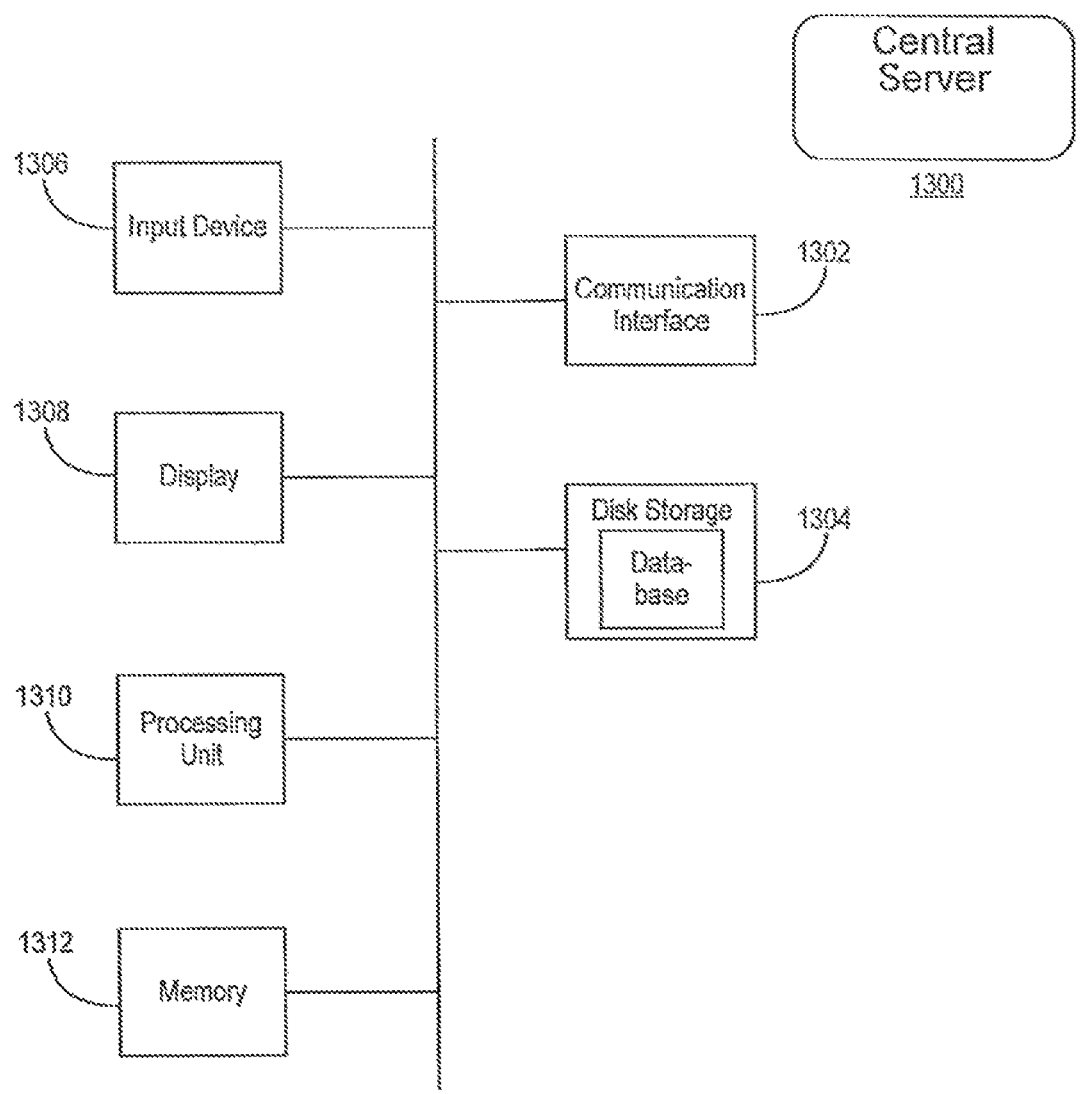
FIG. 13 shows an overview of a server environment according to one embodiment of the invention.

FIG. 13 shows an overview of a server environment 1300 according to one embodiment of the invention, comprised of one or more of a communication interface 1302, storage 1304, input device 1306, display 1308, processing unit 1310, and memory 1312.

Figure 14:
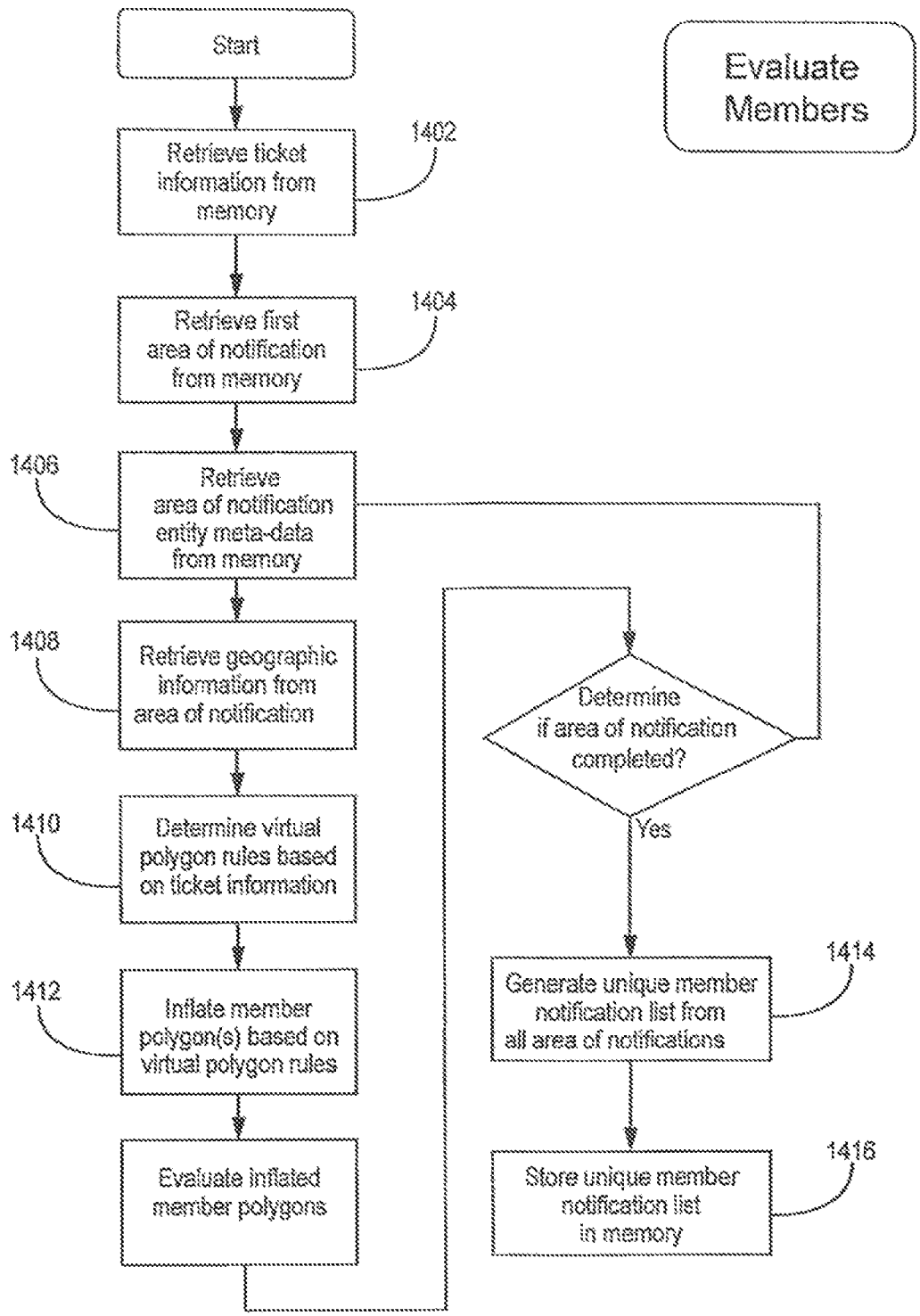
FIG. 14 shows an overview of a process for evaluating excavation entities and subdividing an excavation entity into one or more of an area of notification.

FIG. 14 shows an overview of a process for evaluating excavation entities, the process 1400 comprising retrieving ticket information from memory at step 1402; identifying— iteratively—from ticket information an area of notification and retrieving—iteratively—metadata related to the area of notification at steps 1404 and 1406; identifying geographic information of the area of notification at step 1408; determining the appropriate polygon rules to be applied to the area of notification at step 1410; adjusting or inflating the area of notification based on evaluation against the polygon rules at step 1412; generating a notification list comprised of locate operations and unique locate operation identifiers for each area of notification at step 1414; and storing the notification list data in memory for later retrieval.

Reference herein to "one embodiment", "an embodiment", or similar formulations, means that a particular feature, structure, operation, or characteristic described in connection with the embodiment, is included in at least one embodiment. Thus, the appearances of such phrases or formulations herein are not necessarily all referring to the same embodiment. Furthermore, various particular features, structures, operations, or characteristics may be combined in any suitable manner in one or more embodiments.

It is to be understood that the present invention is not limited to the embodiments described above, but encompasses any and all embodiments, modifications, substitutions and alternate embodiments falling within the scope of the subjoined Claims and their equivalents. The embodiments are intended to cover capabilities and concepts whether they be via a loosely coupled set of components or they be converged into one or more integrated components, devices, circuits and/or software programs, systems or platforms.

We claim:

1. A system for initiating one or more locate operations within an excavation entity, the system comprising:

a computing device in communication with at least one server, each having one or more processors, the computing device being configured with a multi-layered interactive map comprising a top layer, one or more intermediate layers and a bottom layer, the top layer comprising a graphical user interface for entry of geographic dig coordinates defining the excavation entity and the bottom layer comprising a map of at least a portion of the Earth; and an application program interface tangibly stored on the at least one server, wherein the geographic coordinates may be transmitted to the application program interface following entry, wherein upon receipt of the geographic dig coordinates, the application program interface causes a processor to:

configure, by the processor, the multi-layered interactive map to include a top layer, one or more intermediate layers, and a bottom layer based on the geographic dig coordinates, wherein the configuring includes selecting the one or more intermediate layers from the group consisting of a parcel layer, a line map layer, a facility map layer, an ortho map layer, a road features layer, a water features layer, a highway layer, a building footprint layer, a route layer and a TIGER file layer;

receive, via the graphical user interface of the top layer of the configured interactive map, user input defining an excavation entity;

responsive to the user input defining the excavation entity, extract, by the processor, embedded data from within the selected one or more intermediate layers;

determine, by the processor, a number of locate operations, wherein the determining comprises applying area rules programmed in an associated rules engine to the extracted data from the selected one or more intermediate layers and based on the defined excavation entity;

display on the computing device the configured multi-layered interactive map including an indication of the number of locate operations; and responsive to a user selection received via the interface, automatically generate and transmit to a call center, by the processor an electronic ticket for each of the displayed locate operations, wherein the generating includes automatically importing the geographic dig coordinates and the extracted data and applicable area rules to an electronic ticket for each determined locate operation.

2. The system of claim 1, wherein the one or more intermediate layers comprises data indicating the presence or absence of underground facilities and the embedded data comprises rules governing the content of electronic tickets generated by the call center.

3. The system of claim 1, wherein the embedded data comprises government regulations applicable to locate operations or excavation activities within the excavation entity.

4. The system of claim 1, wherein the one or more intermediate layers comprises data indicating the location of national, state, municipal, county, city or local geographic boundary lines.

5. The system of claim 1, wherein the computing device is a portable computing device configured for wireless communication with the at least one server.

6. The system of claim 1, wherein the embedded data comprises the names of owners of any underground facilities within the excavation entity.

* * * * *